(12) United States Patent
Matsumoto et al.

(10) Patent No.: US 10,322,469 B2
(45) Date of Patent: *Jun. 18, 2019

(54) FUSION BONDING PROCESS FOR GLASS

(75) Inventors: Satoshi Matsumoto, Hamamatsu (JP);
Toshimitsu Wakuda, Hamamatsu (JP)

(73) Assignee: HAMAMATSU PHOTONICS K.K.,
Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/994,354

(22) PCT Filed: Jun. 3, 2009

(86) PCT No.: PCT/JP2009/060150
§ 371 (c)(1),
(2), (4) Date: Nov. 23, 2010

(87) PCT Pub. No.: WO2009/150976
PCT Pub. Date: Dec. 17, 2009

(65) Prior Publication Data
US 2011/0067448 A1 Mar. 24, 2011

(30) Foreign Application Priority Data

Jun. 11, 2008 (JP) .................. 2008-153308
Jun. 23, 2008 (JP) .................. 2008-163580

(51) Int. Cl.
*C03B 23/20* (2006.01)
*B23K 26/324* (2014.01)
(Continued)

(52) U.S. Cl.
CPC .......... *B23K 26/324* (2013.01); *C03B 23/245* (2013.01); *C03C 27/06* (2013.01); *Y02P 40/57* (2015.11)

(58) Field of Classification Search
CPC ..... B23K 26/324; C03B 23/245; C03C 27/06; Y02P 40/57
(Continued)

(56) References Cited

U.S. PATENT DOCUMENTS 3,453,097 A 7/1969 Hafner
3,663,793 A 5/1972 Petro et al.
(Continued)

FOREIGN PATENT DOCUMENTS

CN 1329395 1/2002
CN 1738777 2/2006
(Continued)

OTHER PUBLICATIONS

JP 2002366050 (Machine Translation) [online], [retrieved on May 21, 2012], retrieved from PAJ Database (http://www19.ipdl.inpit.go.jp/PA1/cgi-bin/PA1INDEX).*
(Continued)

*Primary Examiner* — Michael H. Wilson
*Assistant Examiner* — Yana B Krinker
(74) *Attorney, Agent, or Firm* — Drinker Biddle & Reath LLP

(57) ABSTRACT

A part of a glass layer 103 disposed along a region to be fused R is irradiated with a laser beam L1, so as to form the glass layer 103 with a laser-absorbing part 108*a* having a high laser absorptance. Then, while using the laser-absorbing part 108*a* as an irradiation initiation position, the region to be fused R is irradiated therealong with a laser beam L2, so as to melt the glass layer 103 and fix the glass layer 103 onto a glass member 104. Since the irradiation initiation position for the laser beam L2 has already become the laser-absorbing part 108*a*, a stable region where the melting of the glass layer 103 is stable can be formed immediately from the start point for initiating the irradiation with the
(Continued)

second laser beam or nearby. The glass member 104 is fused to a glass member 105 through the glass layer 103 having such a stable region formed throughout the region to be fused R, so as to yield a glass fusing structure 101.

18 Claims, 26 Drawing Sheets

(51) Int. Cl.
*C03B 23/24* (2006.01)
*C03C 27/06* (2006.01)

(58) Field of Classification Search
USPC .................................................. 65/36, 43, 45
See application file for complete search history.

(56) References Cited

U.S. PATENT DOCUMENTS

| | | |
|---|---|---|
| 4,339,257 A | 7/1982 | Ueda |
| 4,343,833 A | 8/1982 | Sawae et al. |
| 5,489,321 A | 2/1996 | Tracy et al. |
| 6,075,223 A | 6/2000 | Harrison |
| 6,565,400 B1 | 5/2003 | Lee et al. |
| 7,371,143 B2 | 5/2008 | Becken et al. |
| 7,641,976 B2 | 1/2010 | Lamberson et al. |
| 7,820,941 B2 | 10/2010 | Brown et al. |
| 7,834,550 B2 | 11/2010 | Lee et al. |
| 7,932,670 B2 | 4/2011 | Yoo et al. |
| 8,063,561 B2 | 11/2011 | Choi et al. |
| 8,440,479 B2 | 5/2013 | Nguyen et al. |
| 8,490,434 B2 | 7/2013 | Watanabe et al. |
| 8,516,852 B2 | 8/2013 | Matsumoto et al. |
| 2004/0069017 A1 | 4/2004 | Li et al. |
| 2004/0137201 A1 | 7/2004 | Hannan et al. |
| 2004/0207314 A1 | 10/2004 | Aitken et al. |
| 2005/0103755 A1 | 5/2005 | Baker et al. |
| 2006/0082298 A1 | 4/2006 | Becken et al. |
| 2006/0084348 A1 | 4/2006 | Becken et al. |
| 2007/0007894 A1 | 1/2007 | Aitken et al. |
| 2007/0053088 A1 | 3/2007 | Kranz et al. |
| 2007/0128967 A1 | 6/2007 | Becken et al. |
| 2007/0170845 A1 | 7/2007 | Choi et al. |
| 2007/0173167 A1 | 7/2007 | Choi |
| 2007/0232182 A1 | 10/2007 | Park |
| 2008/0106194 A1 | 5/2008 | Logunov et al. |
| 2008/0124558 A1* | 5/2008 | Boek et al. .................... 428/427 |
| 2008/0135175 A1 | 6/2008 | Higuchi |
| 2008/0182062 A1 | 7/2008 | Becken et al. |
| 2008/0254268 A1 | 10/2008 | Okahata et al. |
| 2009/0071588 A1 | 3/2009 | Kimura et al. |
| 2009/0080055 A1 | 3/2009 | Baur et al. |
| 2009/0086325 A1 | 4/2009 | Liu et al. |
| 2009/0110882 A1 | 4/2009 | Higuchi |
| 2009/0142984 A1 | 6/2009 | Logunov et al. |
| 2009/0297861 A1 | 12/2009 | Banks et al. |
| 2009/0297862 A1 | 12/2009 | Boek et al. |
| 2009/0308105 A1 | 12/2009 | Pastel et al. |
| 2010/0006228 A1 | 1/2010 | Abe et al. |
| 2010/0095705 A1 | 4/2010 | Burkhalter et al. |
| 2010/0116119 A1 | 5/2010 | Bayne |
| 2010/0129666 A1 | 5/2010 | Logunov et al. |
| 2010/0154476 A1* | 6/2010 | Becken et al. .................... 65/36 |
| 2010/0227524 A1 | 9/2010 | Jung et al. |
| 2010/0267307 A1 | 10/2010 | Park et al. |
| 2010/0304513 A1 | 12/2010 | Nguyen et al. |
| 2011/0001424 A1 | 1/2011 | Logunov et al. |
| 2011/0061789 A1 | 3/2011 | Matsumoto |
| 2011/0067448 A1 | 3/2011 | Matsumoto et al. |
| 2011/0072855 A1 | 3/2011 | Matsumoto et al. |
| 2011/0088430 A1 | 4/2011 | Matsumoto |
| 2011/0088431 A1 | 4/2011 | Matsumoto |
| 2011/0135857 A1 | 6/2011 | Logunov et al. |
| 2011/0169108 A1 | 7/2011 | Gardner et al. |
| 2011/0223360 A1 | 9/2011 | Shibuya et al. |
| 2011/0223371 A1 | 9/2011 | Kawanami |
| 2011/0256407 A1 | 10/2011 | Boek et al. |
| 2011/0265518 A1 | 11/2011 | Matsumoto et al. |
| 2012/0111059 A1 | 5/2012 | Watanabe et al. |
| 2012/0147538 A1 | 6/2012 | Kawanami et al. |
| 2012/0151965 A1 | 6/2012 | Matsumoto et al. |
| 2012/0156406 A1 | 6/2012 | Banks et al. |
| 2012/0222450 A1 | 9/2012 | Lamberson et al. |
| 2012/0234048 A1 | 9/2012 | Matsumoto |
| 2012/0240628 A1 | 9/2012 | Matsumoto |
| 2012/0240629 A1 | 9/2012 | Matsumoto |
| 2012/0240630 A1 | 9/2012 | Matsumoto |
| 2012/0240631 A1 | 9/2012 | Matsumoto |
| 2012/0240632 A1 | 9/2012 | Matsumoto |
| 2012/0240633 A1 | 9/2012 | Matsumoto |
| 2012/0247153 A1 | 10/2012 | Matsumoto |
| 2012/0260694 A1 | 10/2012 | Matsumoto |
| 2012/0285200 A1 | 11/2012 | Tanaka |
| 2012/0287026 A1 | 11/2012 | Masuda |
| 2012/0318023 A1 | 12/2012 | Shimomura |
| 2012/0320444 A1 | 12/2012 | Baur et al. |
| 2013/0011598 A1 | 1/2013 | Kawanami et al. |
| 2013/0104980 A1 | 5/2013 | Sridharan et al. |
| 2013/0111953 A1 | 5/2013 | Maloney et al. |
| 2013/0134396 A1 | 5/2013 | Shimomura et al. |
| 2013/0174608 A1 | 7/2013 | Takeuchi et al. |
| 2013/0237115 A1 | 9/2013 | Choi et al. |
| 2013/0280981 A1 | 10/2013 | Lee |
| 2013/0314760 A1 | 11/2013 | Baur et al. |

FOREIGN PATENT DOCUMENTS

| | | | | |
|---|---|---|---|---|
| CN | 1798708 | 7/2006 | | |
| CN | 1798710 | 7/2006 | | |
| CN | 1836177 | 9/2006 | | |
| CN | 101005915 | 7/2007 | | |
| CN | 101095247 | 12/2007 | | |
| CN | 101103429 | 1/2008 | | |
| CN | 101139165 | 3/2008 | | |
| CN | 100409392 C | 8/2008 | | |
| CN | 101312234 | 11/2008 | | |
| CN | 101386477 | 3/2009 | | |
| CN | 101434453 | 5/2009 | | |
| CN | 101501808 | 8/2009 | | |
| CN | 102056858 | 5/2011 | | |
| JP | 2-120259 | 5/1990 | | |
| JP | 5166462 | 7/1993 | | |
| JP | 2000-313630 | 11/2000 | | |
| JP | 2002-015108 | 1/2002 | | |
| JP | 2002-224871 | 8/2002 | | |
| JP | 2002-287107 | 10/2002 | | |
| JP | 2002-366050 | 12/2002 | | |
| JP | 2002-367514 | 12/2002 | | |
| JP | 2002366050 A * | 12/2002 | ............... | G06F 9/00 |
| JP | 2004-182567 | 7/2004 | | |
| JP | 2005-007665 | 1/2005 | | |
| JP | 2005-213125 | 8/2005 | | |
| JP | 2006-151774 | 6/2006 | | |
| JP | 2006-524419 | 10/2006 | | |
| JP | 2007-90405 | 4/2007 | | |
| JP | 2007-264135 | 10/2007 | | |
| JP | 2008-115057 | 5/2008 | | |
| JP | 2008-115067 | 5/2008 | | |
| JP | 2008115057 A * | 5/2008 | | |
| JP | 2008-127223 | 6/2008 | | |
| JP | 2008-527655 | 7/2008 | | |
| JP | 2009-123421 | 6/2009 | | |
| JP | 2009-196859 | 9/2009 | | |
| JP | 2009-196862 | 9/2009 | | |
| KR | 10-2001-0084380 | 9/2001 | | |
| KR | 10-0350323 | 3/2002 | | |
| KR | 10-2007-0003681 | 5/2007 | | |
| KR | 10-2008-0010446 | 1/2008 | | |
| KR | 10-2008-0016457 | 2/2008 | | |
| TW | I495409 | 7/2002 | | |
| TW | 200516064 | 5/2005 | | |
| TW | I255934 | 6/2006 | | |
| TW | 200733787 | 9/2007 | | |
| TW | 200737370 | 10/2007 | | |

(56) References Cited

FOREIGN PATENT DOCUMENTS

| TW | 200822789 | 5/2008 |
|---|---|---|
| TW | 200911438 | 3/2009 |
| TW | 200944908 | 11/2009 |
| WO | WO 2007/067533 | 6/2007 |
| WO | WO 2007067533 A3 * | 4/2009 |
| WO | WO 2009/131144 | 10/2009 |
| WO | WO 2009-150975 | 12/2009 |
| WO | WO 2009-150976 | 12/2009 |
| WO | WO 2009-157281 | 12/2009 |
| WO | WO 2009-157282 | 12/2009 |

OTHER PUBLICATIONS

JP 2008115057 (Machine Translation) [online], [retrieved on May 21, 2012], retrieved from PAJ Database (http://www19.ipdl.inpit.go.jp/PA1/cgi-bin/PA1INDEX).*

JP 2002-366050 (Human Translation), retrieved from USPTO Translation Services.*

JP 2008-115057 (Human Translation), retrieved from USPTO Translation Services.*

U.S. Office Action dated Jun. 6, 2012 that issued in U.S. Appl. No. 13/345,199 including Double Patenting Rejections on pp. 5-8.

U.S. Office Action dated Jun. 28, 2012 that issued in U.S. Appl. No. 12/994,320 including Double Patenting Rejections on pp. 7-9.

U.S. Office Action dated Jul. 9, 2012 that issued in U.S. Appl. No. 12/994,321 including Double Patenting Rejections on pp. 7-9.

Cheung, Kerry, "Die-Level Glass Frit Vacuum Packaging for a Micro-Fuel Processor System," Massachusetts Institute of Technology, Jun. 2005, pp. 17-19.

U.S. Office Action dated Jan. 22, 2014 that issued in U.S. Appl. No. 13/509,112 including Double Patenting Rejections on pp. 4-5.

U.S. Office Action dated Apr. 25, 2013 that issued in U.S. Appl. No. 12/994,539 including Double patenting rejections on pp. 5-8.

U.S. Office Action dated Jan. 22, 2013 that issued in U.S. Appl. No. 13/345,199 including Double patenting rejections on pp. 6-8.

U.S. Office Action dated Jul. 2, 2014 that issued in U.S. Appl. No. 13/511,754 including Double Patenting Rejections on pp. 5-8.

U.S. Office Action dated May 9, 2013 that issued in U.S. Appl. No. 12/994,399 including Double Patenting Rejections on pp. 6-10.

U.S. Office Action dated Jun. 3, 2014 that issued in U.S. Appl. No. 13/511,683 including Double Patenting Rejections on pp. 5-11.

U.S. Office Action dated Feb. 24, 2015 that issued in U.S. Appl. No. 13/345,199 including Double Patenting Rejections on pp. 4-14.

U.S. Office Action dated Jan. 16, 2014 that issued in U.S. Appl. No. 13/511,735 including Double Patenting Rejections on pp. 4-8.

U.S. Office Action dated Jan. 28, 2014 that issued in U.S. Appl. No. 13/511,688 including Double Patenting Rejections on pp. 4-8.

U.S. Office Action dated Jul. 1, 2014 that issued in U.S. Appl. No. 13/511,738 including Double Patenting Rejections on pp. 4-5.

U.S. Office Action dated Jul. 1, 2014 that issued in U.S. Appl. No. 13/511,747 including Double Patenting Rejections on pp. 4-5.

U.S. Office Action dated Apr. 25, 2014 that issued in U.S. Appl. No. 13/511,721 including Double Patenting Rejections on pp. 2-3.

U.S. Office Action dated May 1, 2018 that issued in a U.S. Appl. No. 15/852,381, including double patenting rejections at pp. 3-5.

* cited by examiner (a)

(b)

(a)

(b)

FUSION BONDING PROCESS FOR GLASS

TECHNICAL FIELD

The present invention relates to a glass fusing method for manufacturing a glass fusing structure by fusing glass members together.

BACKGROUND ART

Known as a conventional glass fusing method in the above-mentioned technical field is one comprising burning a glass layer containing a laser-absorbing pigment onto one glass member along a region to be fused, then overlaying the other glass member on the former glass member such that the glass layer is interposed therebetween, and irradiating the region to be fused therealong with a laser beam, so as to fuse one glass member and the other glass member together.

Meanwhile, a typical technique for burning a glass layer onto a glass member is one removing an organic solvent and a binder from a paste layer containing a glass fit, a laser-absorbing pigment, the organic solvent and the binder, so as to fix the glass layer firmly to the glass member; and then heating the glass member having the glass layer firmly attached thereto in a firing furnace, so as to melt the glass layer, thereby burning the glass layer onto the glass member (see, for example, Patent Literature 1).

On the other hand, proposed from the viewpoint of suppressing the increase in energy consumption and burning time caused by the use of the firing furnace (i.e., the viewpoint of higher efficiency) is a technique which irradiates a glass layer firmly attached to a glass member with a laser beam, so as to melt the glass layer, thereby burning the glass layer onto the glass member (see, for example, Patent Literature 2).

CITATION LIST

Patent Literature

Patent Literature 1: Japanese Translated International Patent Application Laid-Open No. 2006-524419
Patent Literature 2: Japanese Patent Application Laid-Open No. 2002-366050

SUMMARY OF INVENTION

Technical Problem

However, there have been cases where the fused state becomes uneven in the glass members fused together through the glass layer burned onto the glass member by irradiation with a laser beam.

In view of such circumstances, it is an object of the present invention to provide a glass fusing method which can attain a uniform fused state between the glass members.

Solution to Problem

For achieving the above-mentioned object, the inventors conducted diligent studies and, as a result, have found out that the fused state between the glass members becomes uneven because of the fact that the laser absorptance of the glass layer drastically increases when the temperature of the glass layer exceeds its melting point $T_m$ at the time of burning as illustrated in FIG. 11. That is, in the glass layer firmly attached to the glass member, voids formed by the removal of the binder and the graininess of the glass frit produce scattering of light exceeding the absorption characteristic of the laser-absorbing pigment, so that the laser absorptance is low (e.g., the glass layer appears whiter under visible light). When a laser beam is emitted in such a state in order to burn the glass layer onto the glass member, the glass fit melts to fill the voids and loses the graininess, so that the laser-absorbing pigment remarkably exhibits its absorption characteristic, whereby the glass layer drastically increases its laser absorptance (e.g., appears darker under visible light). Here, as illustrated in FIG. 12, the laser beam has such a temperature distribution that the temperature at the center part in the width direction (direction substantially orthogonal to the laser beam moving direction) becomes higher.

Therefore, when the laser beam is moved after staying at an irradiation initiation position for a while in order to make a stable region where the glass layer melts throughout the width from the irradiation initiation position, the melting initiated at the widthwise center part may raise the laser absorptance at the center part so that the widthwise center part melts more than necessary, thereby causing cracks in the glass member and crystallizing the glass layer. Hence, in the burning of the glass layer, the laser beam is moved even when the melting is in an unstable state at the laser irradiation initiation position as illustrated in FIG. 13, so that the melting gradually widens to attain a stable state. As a result, an unstable region where the melting is unstable extends from the irradiation initiation position until the stable state is attained. Since the laser absorptance varies between the unstable and stable regions, a glass fusing structure having an uneven fused state is manufactured when glass members are fused together through the glass layer having such an unstable region. The inventors have further conducted studies based on this finding, thereby completing the present invention.

Also, when the laser beam is moved after staying at an irradiation initiation position for a while in order to make a stable region where the glass layer melts throughout the width from the irradiation initiation position, the melting initiated at the widthwise center part may raise the laser absorptance at the center part so that the center part falls into an excessive heat input state, thereby causing cracks in the glass member and crystallizing the glass layer. Therefore, when the laser beam is moved before melting the glass layer throughout the width at the laser beam irradiation initiation position as illustrated in FIG. 13, an unstable region where the width of melting gradually increases from the center part extends from the irradiation initiation position until a stable state is attained. Since the laser absorptance varies between the unstable and stable regions, a glass fusing structure having an uneven fused state is manufactured when glass members are fused together through the glass layer having such an unstable region. The inventors have further conducted studies based on this finding, thereby completing the present invention.

The change in color of the glass layer under visible light in the case where the laser absorptance of the glass layer is enhanced by the melting of the glass layer is not limited to the change from a whiter state to a darker state. For example, laser-absorbing pigments for near-infrared laser beams include those exhibiting green when the glass layer melts.

The glass fusing method in accordance with one aspect of the present invention is a glass fusing method for manufacturing a glass fusing structure by fusing first and second glass members together, the method comprising the steps of disposing a glass layer on the first glass member along a region to be fused, the glass layer being formed by removing an organic solvent and a binder from a paste layer containing a glass powder, a laser-absorbing material, the organic solvent and the binder; irradiating a part of the glass layer with a first laser beam, so as to melt the part of the glass layer and form a laser-absorbing part in the glass layer; irradiating the region to be fused therealong with a second laser beam while using the laser-absorbing part as an irradiation initiation position, so as to melt the glass layer and fix the glass layer to the first glass member; and overlaying the second glass member on the first glass member having the glass layer fixed thereto such that the glass layer is interposed therebetween, and irradiating the region to be fused therealong with a third laser beam, so as to fuse the first and second glass members together.

In this glass fusing method, before fixing a glass layer to a first glass member by melting the glass layer, a part of the glass layer is irradiated with a first laser beam, so as to melt the part of the glass layer and form the glass layer with a laser-absorbing layer having a laser absorptance higher than that of a part not irradiated with the first laser beam. Then, the region to be fused is irradiated therealong with a second laser beam while using the laser-absorbing part as an irradiation initiation position, so as to melt the glass layer and fix the glass layer to the first glass member. Since the irradiation initiation position for the second laser beam has already become the laser-absorbing part as such, a stable region where the melting of the glass layer is stable can be formed immediately from the start point for initiating the irradiation with the second laser beam or nearby. As a result, the first and second glass members are fused together through the glass layer formed with such a stable region, whereby the fused state between the glass members can be made uniform.

Preferably, in the glass fusing method in accordance with the present invention, the laser-absorbing part is formed in the part of the glass layer throughout the width of the glass layer in a direction intersecting a moving direction of the second laser beam with respect to the region to be fused. In this case, the laser-absorbing part is formed throughout the width, whereby the melting of the glass layer can be stabilized earlier. More preferably, the laser-absorbing part is formed such that a center part thereof in the direction intersecting the moving direction of the second laser beam with respect to the region to be fused projects in the moving direction of the second laser beam. In the temperature distribution in the laser beam moving direction, as illustrated in FIG. 12, the temperature tends to become lower at both end parts in the width direction of the laser-absorbing part than at the center part. When the laser-absorbing part is formed such that the center part in the width direction projects in the moving direction, the temperature at the center part rises faster, so that the heat at the center part in the width direction propagates to both end parts in a shorter time, whereby both end parts are heated fully, which makes it possible for the melting in the width direction of the laser-absorbing part to become more uniform.

Preferably, in the glass fusing method in accordance with the present invention, a plurality of laser-absorbing parts are formed intermittently along the region to be fused, while one of the plurality of laser-absorbing parts is used as the irradiation initiation position. Even when the second laser scanning speed is so fast that the melting may fail to catch up, whereby an unstable region is likely to be formed, intermittently forming a plurality of laser-absorbing parts along the region to be fused as such can periodically form high absorption regions, thereby continuously stabilizing the melting of the glass layer without returning it to the unstable state. This can shorten the manufacturing time by raising the scanning speed and improve the manufacturing yield.

The glass fusing method in accordance with another aspect of the present invention is a glass fusing method for manufacturing a glass fusing structure by fusing first and second glass members together, the method comprising the steps of disposing a glass layer on the first glass member along a region to be fused and a predetermined region connected to the region to be fused, the glass layer being formed by removing an organic solvent and a binder from a paste layer containing a glass powder, a laser-absorbing material, the organic solvent and the binder; irradiating the predetermined region therealong from an irradiation initiation position in the predetermined region with a first laser beam and then continuously irradiating the region to be fused therealong with the first laser beam, so as to melt the glass layer and fix the glass layer to the first glass member; and overlaying the second glass member on the first glass member having the glass layer fixed thereto such that the glass layer is interposed therebetween, and irradiating the region to be fused therealong with a second laser beam, so as to fuse the first and second glass members together.

In this glass fusing method, when fixing a glass layer to a first glass member, a predetermined region connected to a region to be fused is irradiated therealong with a first laser beam from an irradiation initiation position in the predetermined region, whereby the melting of the glass layer expands in the width direction in the predetermined region. Since the glass layer is thus melted beforehand in the predetermined region, the ratio of the unstable region in the region to be fused is reduced, whereby the glass layer can be fixed to the first glass member while having an enhanced ratio of the stable region. As a result, the first and second glass members can be fused together through the glass layer having reduced the unstable region, whereby the fused state between the glass members can be made uniform. Here, the "stable region" means a region where the glass layer is melted throughout its width, whereas the "unstable region" means a region where the glass layer is melted only in a part of the width.

Preferably, in the glass fusing method in accordance with the present invention, the predetermined region includes the whole unstable region where the melting of the glass layer becomes unstable when irradiated once from the irradiation initiation position with the first laser beam. When the region to be fused is irradiated therealong with the first laser beam after the glass layer is turned into a stable region by the preliminary melting in the predetermined region, the glass layer in the region to be fused is constructed by a stable region.

Preferably, in the glass fusing method in accordance with the present invention, the predetermined region is disposed on the outside of a ring-shaped region to be fused. When the predetermined region is disposed on the outside, powders such as glass powders generated from unmelted parts in the predetermined region including unstable regions can be kept from entering the region to be fused.

Preferably, the glass fusing method in accordance with the present invention further comprises the step of arranging the region to be fused and the predetermined region connected to one end part of the region to be fused along a first line extending in a predetermined direction in the first glass member and arranging the region to be fused and the predetermined region connected to the other end part of the region to be fused along a second line extending in the predetermined direction in the first glass member; wherein, during irradiation with the first laser beam, the first laser beam is relatively moved from one side to the other side along the first line and then continuously relatively moved from the other side to the one side along the second line. Thus moving the first laser beam to-and-fro along the first and second lines extending in the predetermined direction can melt a glass layer preliminarily in a predetermined region and then a region to be fused continuously in the regions to be fused arranged along the first and second lines, whereby a plurality of glass layers having enhanced ratios of stable regions can be obtained efficiently.

Preferably, the glass fusing method in accordance with the present invention further comprises the step of arranging at least two sets each constituted by the region to be fused and the predetermined region connected to one end part of the region to be fused along a line extending in a predetermined direction in the first glass member; wherein, during irradiation with the first laser beam, the first laser beam is relatively moved from one side to the other side along the line. Thus moving the first laser beam along the line extending in the predetermined direction can melt a glass layer preliminarily in a predetermined region and then a region to be fused continuously in at least two sets of the regions to be fused arranged along the first line, whereby a plurality of glass layers having enhanced ratios of stable regions can be obtained efficiently.

Advantageous Effects of Invention

The present invention can attain a uniform fused state between glass members.

DESCRIPTION OF EMBODIMENTS

Figure 1:
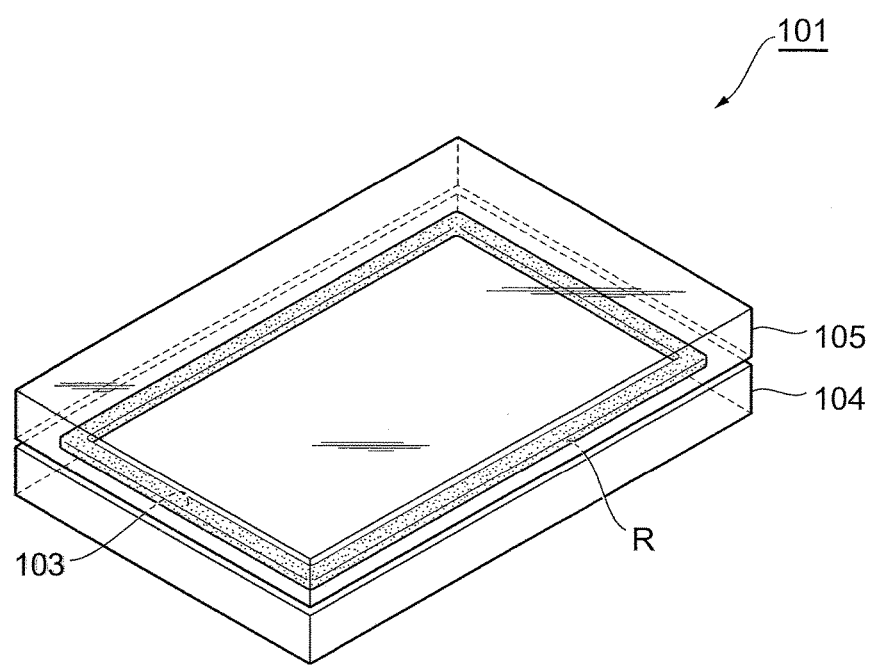
FIG. 1 is a perspective view of a glass fusing structure manufactured by the glass fusing method in accordance with a first embodiment.

In the following, preferred embodiments of the present invention will be explained in detail with reference to the drawings. In the drawings, the same or equivalent parts will be referred to with the same signs while omitting their overlapping descriptions.

First Embodiment

FIG. 1 is a perspective view of a glass fusing structure manufactured by a mode of the glass fusing method in accordance with the first embodiment. As illustrated in FIG. 1, the glass fusing structure 101 is a fusion-bonded grass structure in which glass members (first and second glass members) 104, 105 are fused together through a glass layer 103 formed along a region to be fused R. For example, each of the glass members 104, 105 is a rectangular plate-shaped member made of alkali-free glass having a thickness of 0.7 mm, while the region to be fused R is arranged like a rectangular ring along the outer edges of the glass members 104, 105 with a predetermined width. For example, the glass layer 103 is made of low-melting glass (vanadium-phosphate-based glass, lead borosilicate glass, or the like) and formed into a rectangular ring along the region to be fused R with a predetermined width.

The glass fusing method for manufacturing the above-mentioned glass fusing structure 101 will now be explained.

Figure 2:
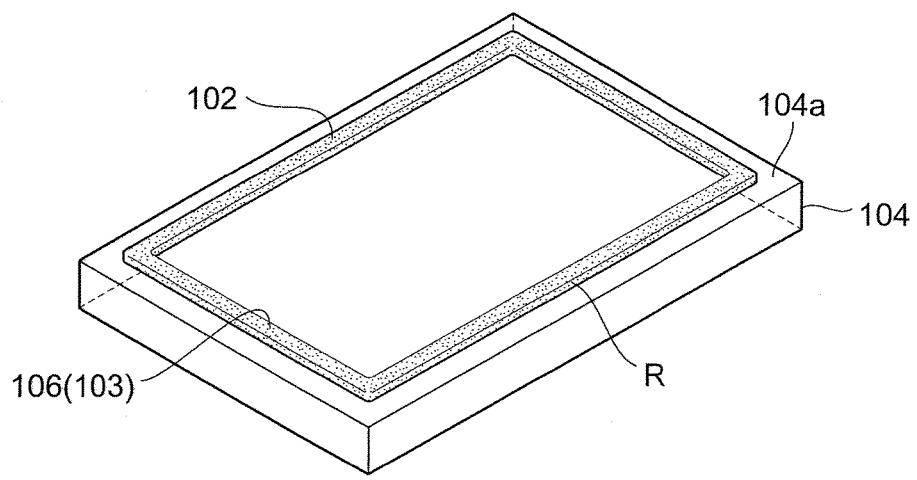
FIG. 2 is a perspective view for explaining the glass fusing method in accordance with the first embodiment.

First, as illustrated in FIG. 2, a frit paste is applied by a dispenser, screen printing, or the like, so as to form a paste layer 106 on a surface 104a of the glass member 104 along the region to be fused R. An example of the frit paste is one formed by kneading a powdery glass frit (glass powder) 102 made of amorphous low-melting glass (vanadium-phosphate-based glass, lead borosilicate glass, or the like), a laser-absorbing pigment (laser-absorbing material) which is an inorganic pigment such as iron oxide, an organic solvent such as amyl acetate, and a binder which is a resin component (such as acrylic resin) thermally decomposable at the glass softening temperature or lower. The frit paste may also be one in which a glass frit (glass powder) made of powdered low-melting glass doped beforehand with a laser-absorbing pigment (laser-absorbing material), an organic solvent, and a binder are kneaded together. That is, the paste layer 106 contains the glass frit 102, laser-absorbing pigment, organic solvent, and binder.

Subsequently, the paste layer 106 is dried, so as to eliminate the organic solvent, and further heated, so as to remove the binder, thereby firmly attaching the glass layer 103 extending with a predetermined width onto the surface 104*a* of the glass member 104 along the region to be fused R. Here, voids formed by the removal of the binder and the graininess of the glass frit 102 produce scattering of light exceeding the absorption characteristic of the laser-absorbing pigment, so that the glass layer 103 firmly attached to the surface 104*a* of the glass member 104 is in a low laser absorptance state (e.g., appears whiter under visible light).

Figure 3:
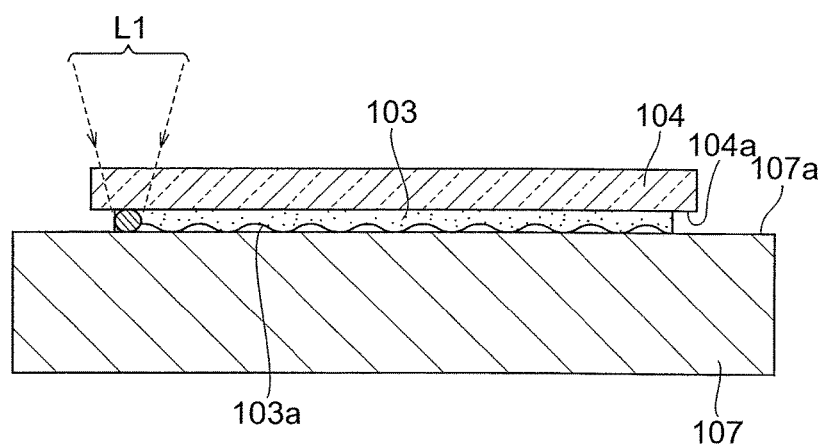
FIG. 3 is a sectional view for explaining the glass fusing method in accordance with the first embodiment.
Figure 4:
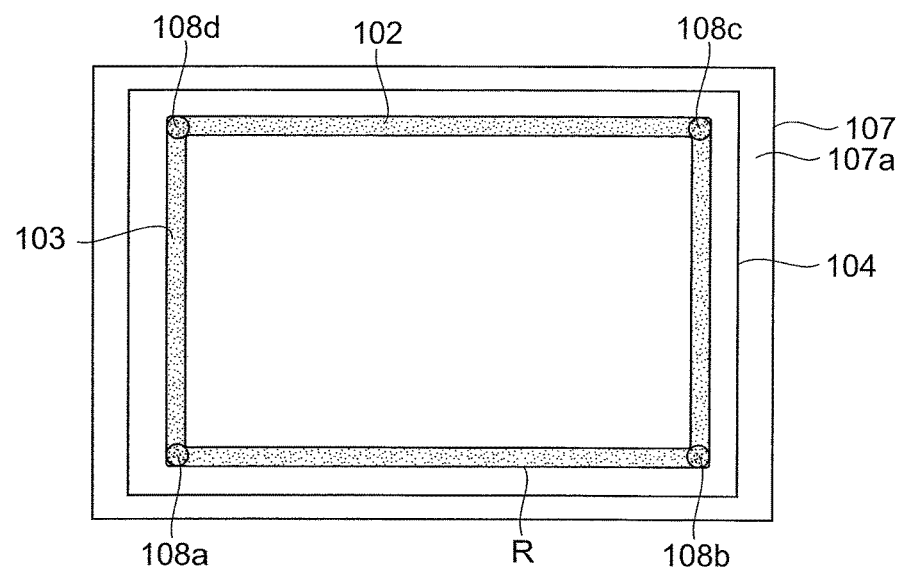
FIG. 4 is a plan view for explaining the glass fusing method in accordance with the first embodiment.

Next, as illustrated in FIG. 3, the glass member 104 is mounted on a surface 107*a* (a polished surface here) of a planar mount table 107 made of aluminum, such that the glass layer 103 is interposed therebetween. Then, a laser beam (first laser beam) L1 is emitted such that a converging spot is located at one corner of the glass layer 103 formed into a rectangular ring along the region to be fused R. The spot diameter of the laser beam L1 is set greater than the width of the glass layer 103, while the laser beam L1 irradiating glass layer 103 is adjusted such as to have a substantially uniform power in the width direction (direction substantially orthogonal to the laser moving direction). As a consequence, a part of the glass layer is evenly melted throughout the width, so that a laser-absorbing part 108*a* having a high laser absorptance is formed throughout the width. Thereafter, as illustrated in FIG. 4, the remaining three corners of the glass layer 103 are sequentially irradiated with the laser beam L1, so as to form laser-absorbing parts 108*b*, 108*c*, 108*d*. In the laser-absorbing parts 108*a* to 108*d*, as the glass frit 102 melts to fill voids, parts (corners) of the glass layer lose the graininess, so as to allow the laser-absorbing pigment to exhibit its absorption characteristic remarkably, thereby attaining a laser absorptance higher than that in regions not irradiated with the laser beam (e.g., only the corners corresponding to the laser-absorbing parts 108*a* to 108*d* appear darker under visible light).

Figure 5:
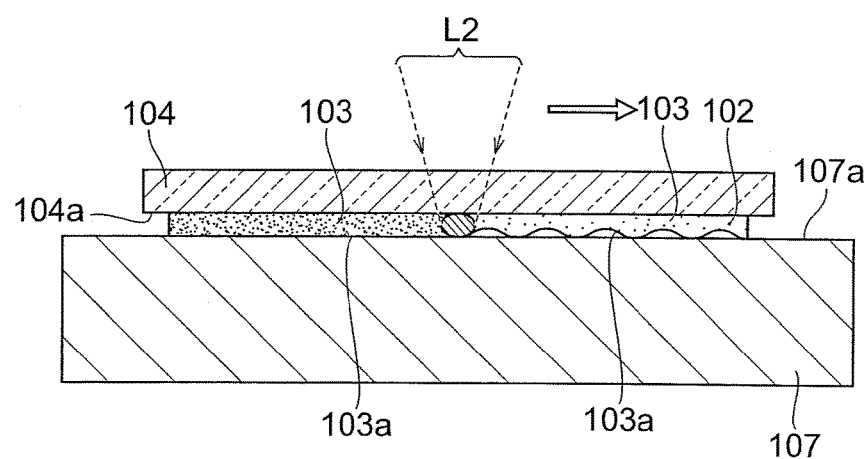
FIG. 5 is a sectional view for explaining the glass fusing method in accordance with the first embodiment.
Figure 6:
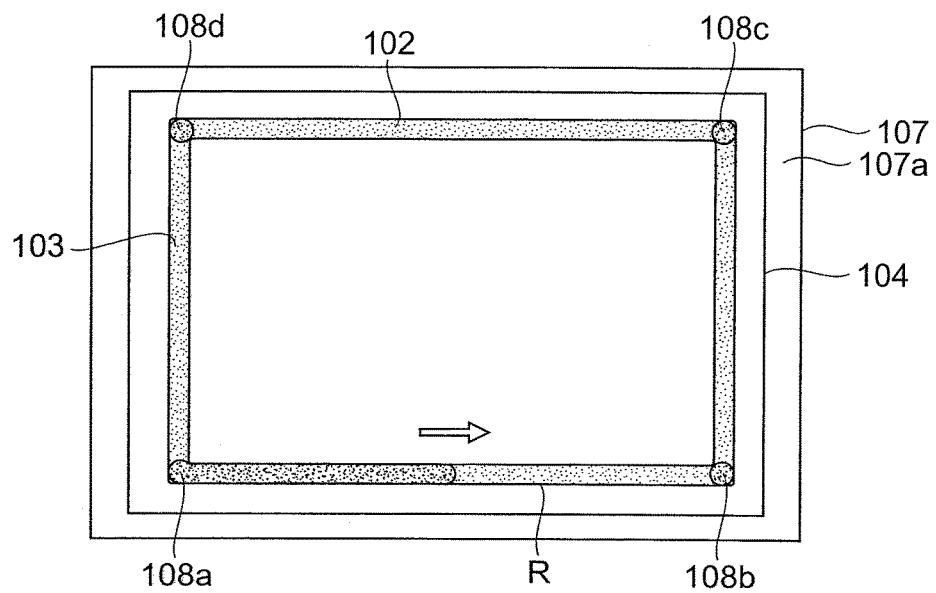
FIG. 6 is a plan view for explaining the glass fusing method in accordance with the first embodiment.

Thereafter, as illustrated in FIGS. 5 and 6, the region to be fused R is irradiated therealong with a laser beam (second laser beam) L2 moved in the direction of the depicted arrow from the laser-absorbing part 108*a* shown in the lower left in FIG. 6 acting as a start point (irradiation initiation position), while locating a converging spot at the glass layer 103. This melts and resolidifies the glass layer 103 disposed on the glass member 104, thereby burning the glass layer 103 onto the surface 104*a* of the glass member 104. When burning the glass layer 103, the irradiation with the laser beam L2 is started such that the laser-absorbing part 108*a* having already enhanced the laser absorptance is employed as the irradiation initiation position. Therefore, the melting of the glass layer 103 is effected throughout the width immediately from the irradiation initiation position, so as to form a stable region where the melting is stable, whereby the unstable region where the melting of the glass layer 103 is unstable is reduced throughout the region to be fused R. Since the remaining three corners are also provided with the laser-absorbing parts 108*b* to 108*d*, respectively, the corners where load is likely to apply when functioning as the glass fusing structure reliably melt at the time of burning. Throughout the region to be fused R, as the glass frit 102 melts to fill voids, the glass layer 103 loses the graininess, so as to allow the laser-absorbing pigment to exhibit its absorption characteristic remarkably, thereby attaining a laser absorptance higher than that in regions not irradiated with the laser beam (e.g., appearing darker under visible light).

After the stable burning of the glass layer 103 is thus completed throughout the region to be fused R, the glass member 104 having the glass layer 103 burned thereonto is removed from the mount table 107. Here, since the difference between the coefficients of linear expansion of the glass frit 102 and the mount table 107 is greater than the difference between the coefficients of linear expansion of the glass frit 102 and the glass member 104, the glass layer 103 does not firmly attach to the mount table 107. Since the surface 107*a* of the mount table 107 is polished, the glass layer 103 burned onto the surface 104*a* of the glass member 104 is in a state where irregularities on the surface 103*a* on the side opposite from the glass member 104 are made flat. In this embodiment, the burning is carried out by irradiation with the laser beam L2 from the glass member 104 side, so that the glass layer 103 is reliably fixed to the glass member 104, while crystallization is reduced on the surface 103*a* side, whereby the melting point does not rise in this part.

Figure 7:
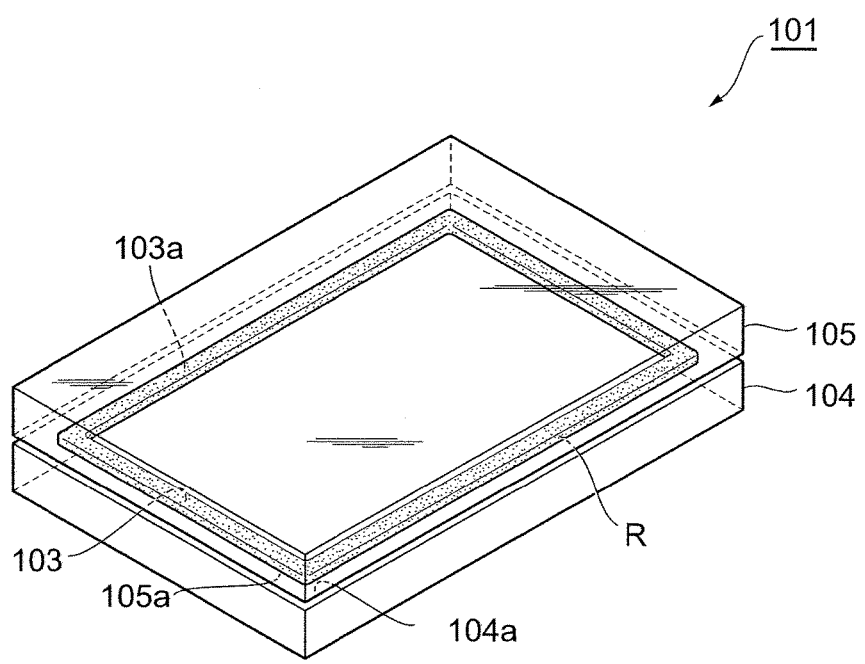
FIG. 7 is a perspective view for explaining the glass fusing method in accordance with the first embodiment.

Subsequent to the burning of the glass layer 103, as illustrated in FIG. 7, the glass member 105 is overlaid on the glass member 104 having the glass layer 103 burned thereonto, such that the glass layer 103 is interposed therebetween. Here, since the surface 103*a* of the glass layer 103 is made flat, a surface 105*a* of the glass member 105 comes into contact with the surface 103*a* of the glass layer 103 without gaps.

Figure 8:
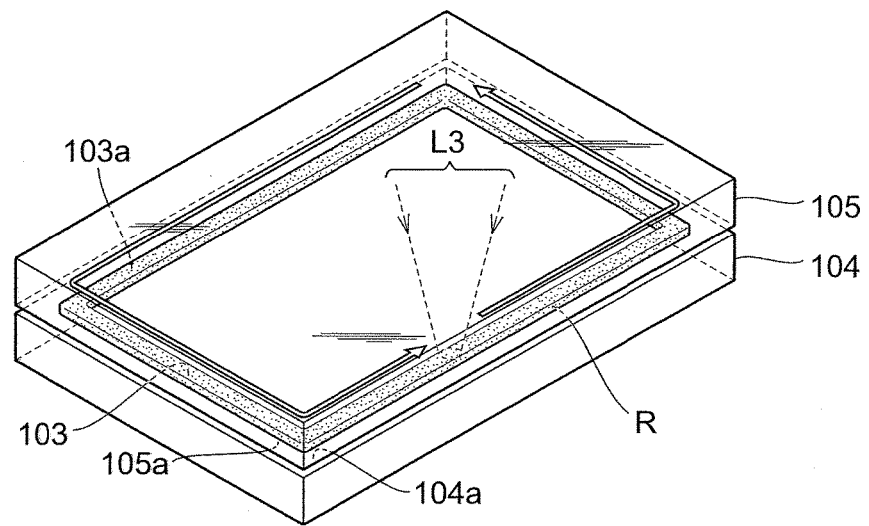
FIG. 8 is a perspective view for explaining the glass fusing method in accordance with the first embodiment.

Then, as illustrated in FIG. 8, the region to be fused R is irradiated therealong with a laser beam (third laser beam) L3 while locating a converging spot at the glass layer 103. As a consequence, the glass layer 103 in a uniform state with a high laser absorptance throughout the region to be fused R absorbs the laser beam L3, which melts and resolidifies the glass layer 103 and its peripheral portions (the portions of the glass members 104, 105 on the surfaces 104*a*, 105*a*) to similar extents, thereby bonding the glass members 104, 105 together. Here, the surface 105*a* of the glass member 105 comes into contact with the surface 103*a* of the glass layer 103 without gaps, while the glass layer 103 burned onto the glass member 104 is formed as a stable region where the melting is stable throughout the region to be fused R, whereby the glass members 104, 105 are uniformly fused along the region to be fused R.

As explained in the foregoing, before melting the glass layer 103 and fixing the glass layer 103 to the glass member 104, the glass fusing method for manufacturing the glass fusing structure 101 irradiates a part of the glass layer 103 with the laser beam L1, so as to melt the part of the glass layer 103 and form the four corners of the glass layer 103 with the laser-absorbing parts 108*a* to 108*d* having a laser absorptance higher than that in the part not irradiated with the laser beam L1. Then, the region to be fused R is irradiated therealong with the laser beam L2 while using one of the plurality of laser-absorbing parts 108*a* to 108*d* as an irradiation initiation position, so as to melt the glass layer 103 and fix the glass layer 103 to the glass member 104. Since the irradiation initiation position for the laser beam L2 is thus turned into the laser-absorbing part 108*a*, a stable region where the melting of the glass layer 103 is stable can be formed immediately from the start point for initiating the irradiation with the laser beam L2 or nearby. As a result, the glass members 104, 105 are fused together through the glass layer 103 formed with such a stable region, whereby the fused state between the glass members 104, 105 can easily be made uniform.

In the above-mentioned glass fusing method, the laser-absorbing part 108a is formed in a part (corner) of the glass layer 103 throughout the width of the glass layer 103 in a direction intersecting the moving direction of the laser beam L2 with respect to the region to be fused R. This can stabilize the melting of the glass layer 103 earlier, since the laser-absorbing part 108a is formed throughout the width. Each of the laser-absorbing parts 108a to 108d is formed substantially circular such that the center part in the direction intersecting the moving direction of the laser beam L2 with respect to the region to be fused R projects in the moving direction of the laser beam L2. Such a form achieves more uniform melting in the direction intersecting the moving direction of the laser beam L2.

The above-mentioned glass fusing method intermittently forms the laser-absorbing parts 108a to 108d and uses one of them, i.e., the laser-absorbing part 108a, as an irradiation initiation position. Even when the scanning speed for the laser beam L2 is so fast that the melting may fail to catch up, whereby an unstable region is likely to be formed, intermittently forming the plurality of laser-absorbing parts 108a to 108d along the region to be fused R as such can periodically form high absorption regions, thereby continuously stabilizing the melting of the glass layer 103 without returning it to the unstable state. This can shorten the manufacturing time by raising the scanning speed and improve the manufacturing yield. The corners, where load is likely to apply when the glass fusing structure is formed, are provided with the laser-absorbing parts 108a to 108d and thus can melt reliably as well.

The present invention is not limited to the above-mentioned first embodiment.

For example, while the first embodiment sequentially forms the laser-absorbing parts 108a to 108d, four lasers may be used so as to form the laser-absorbing parts 108a to 108d at the same time. The step of disposing the glass layer 103 on the glass member 104 and the step of forming the laser-absorbing parts 108a to 108d in the glass layer 103 may also be carried out at substantially the same time.

Figure 9:
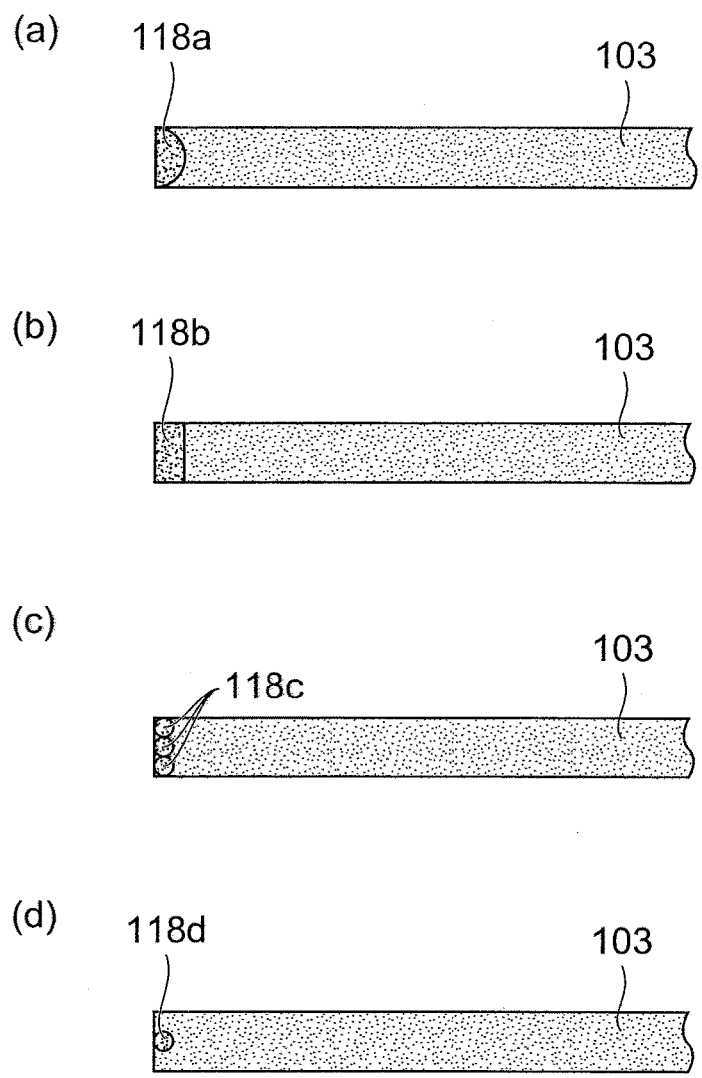
FIG. 9 is a view illustrating modified examples of a laser-absorbing part.

Also, as illustrated in FIG. 9, a semicircular laser-absorbing part 118a, a rectangular laser-absorbing part 118b, a laser-absorbing part 118c having a plurality of circles formed in the width direction thereof, a laser-absorbing part 118d formed with a minute circle at the widthwise center part thereof, and the like may be formed, and irradiation with the laser beam L2 may be carried out while using any of these laser-absorbing parts 118a to 118d as an irradiation initiation position, so as to burn the glass layer 103.

Figure 10:
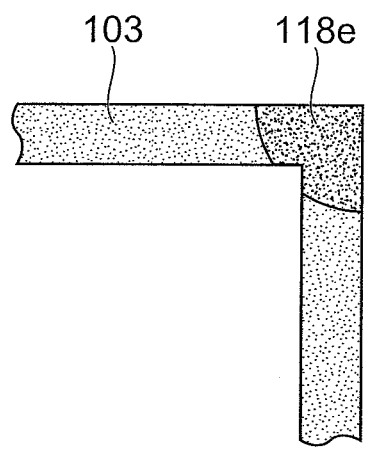
FIG. 10 is a view illustrating other modified examples of the laser-absorbing part.
Figure 10:
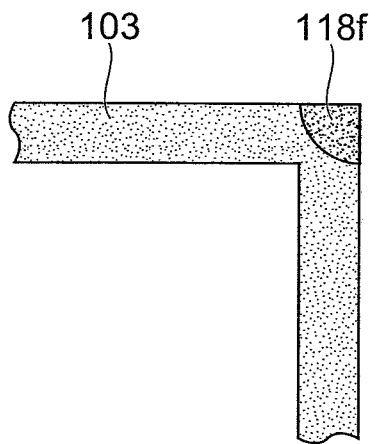
Figure 11:
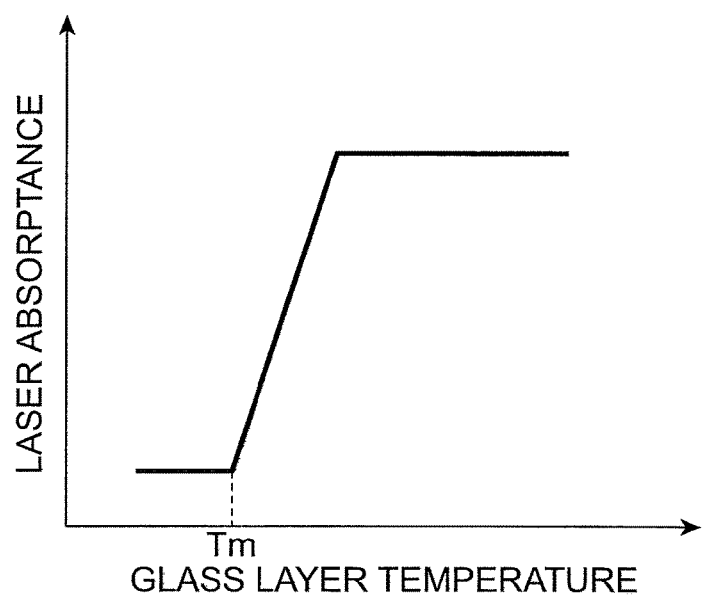
FIG. 11 is a graph illustrating the relationship between the temperature and laser absorptance of a glass layer.

When making a laser-absorbing part at a corner of the region to be fused R formed into a rectangular ring, fan-shaped laser-absorbing parts 118e, 118f and the like may be formed as illustrated in FIG. 10, and irradiation with the laser beam L2 may be carried out while using any of these laser-absorbing parts 118e and 118f as an irradiation initiation position, so as to effect burning.

When intermittently making laser-absorbing parts, the laser-absorbing parts 118a to 118d may be provided at the respective corners as illustrated in the above-mentioned first embodiment, or a plurality of laser-absorbing parts may be disposed at predetermined intervals in a linear part of the glass layer 103.

Though the first embodiment irradiates the glass layer 103 with the laser beams L1, L2 through the glass member 104, the glass layer 103 may be directly irradiated with the laser beams L1, L2 from the opposite side.

Second Embodiment

Figure 14:
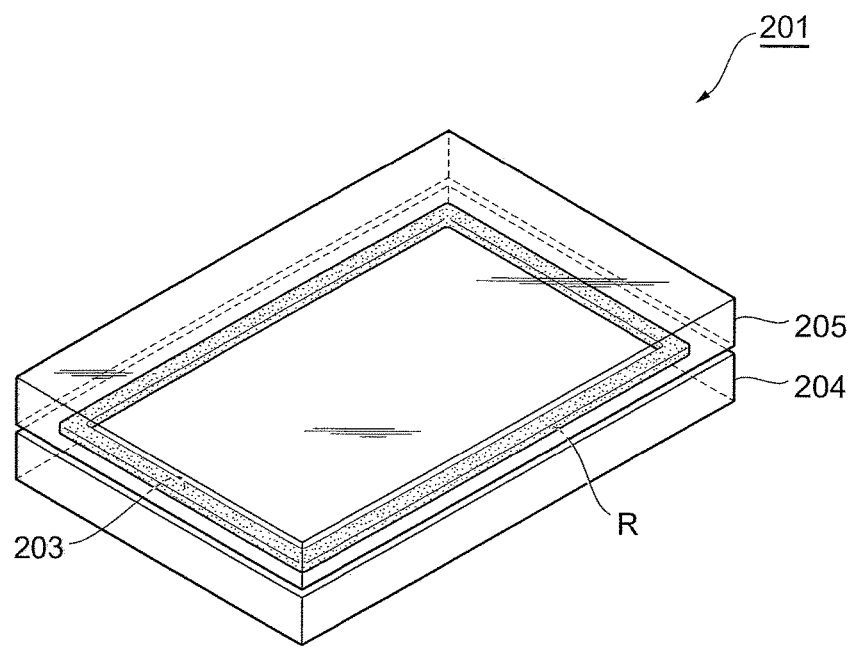
FIG. 14 is a perspective view of a glass fusing structure manufactured by the glass fusing method in accordance with a second embodiment.

FIG. 14 is a perspective view of a glass fusing structure manufactured by the glass fusing method in accordance with the second embodiment. As illustrated in FIG. 14, the glass fusing structure 201 is a fusion-bonded grass structure in which glass members (first and second glass members) 204, 205 are fused together through a glass layer 203 formed along a region to be fused R. For example, each of the glass members 204, 205 is a rectangular plate-shaped member made of alkali-free glass having a thickness of 0.7 mm, while the region to be fused R is arranged like a rectangular ring along the outer edges of the glass members 204, 205 with a predetermined width. For example, the glass layer 203 is made of low-melting glass (vanadium-phosphate-based glass, lead borosilicate glass, or the like) and formed into a rectangular ring along the region to be fused R with a predetermined width.

The glass fusing method for manufacturing the above-mentioned glass fusing structure 201 will now be explained.

Figure 15:
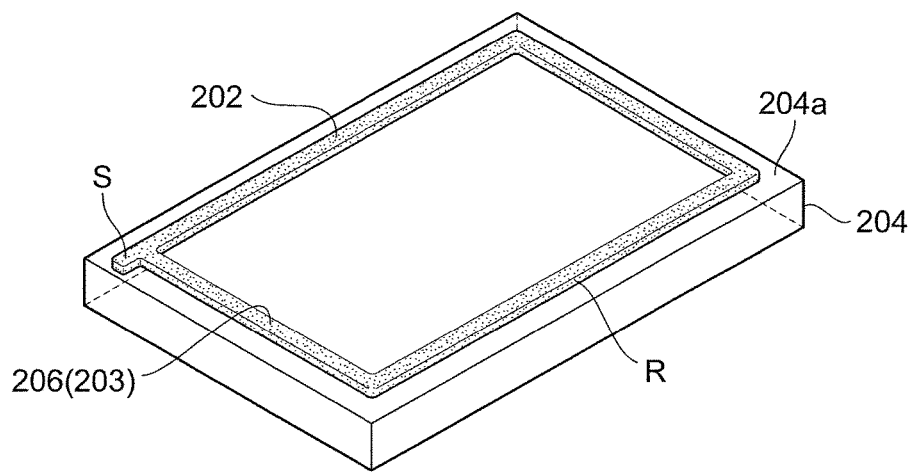
FIG. 15 is a perspective view for explaining the glass fusing method in accordance with the second embodiment.

First, as illustrated in FIG. 15, a frit paste is applied by a dispenser, screen printing, or the like, so as to form a paste layer 206 on a surface 204a of the glass member 204 along the rectangular-ring-shaped region to be fussed R and an approach region S which is connected to one corner of the region to be fused R and projects to the outside. An example of the frit paste is one formed by kneading a powdery glass frit (glass powder) 202 made of amorphous low-melting glass (vanadium-phosphate-based glass, lead borosilicate glass, or the like), a laser-absorbing pigment (laser-absorbing material) which is an inorganic pigment such as iron oxide, an organic solvent such as amyl acetate, and a binder which is a resin component (such as acrylic resin) thermally decomposable at the glass softening temperature or lower. The fit paste may also be one in which a glass frit (glass powder) made of powdered low-melting glass doped beforehand with a laser-absorbing pigment (laser-absorbing material), an organic solvent, and a binder are kneaded together. That is, the paste layer 206 contains the glass frit 202, laser-absorbing pigment, organic solvent, and binder.

Subsequently, the paste layer 206 is dried, so as to eliminate the organic solvent, and further heated, so as to remove the binder, thereby firmly attaching the glass layer 203 onto the surface 204a of the glass member 204 along the region to be fused R and the approach region S connected to the region to be fused R. Here, voids formed by the removal of the binder and the graininess of the glass frit 202 produce scattering of light exceeding the absorption characteristic of the laser-absorbing pigment, so that the glass layer 203 firmly attached to the surface 204a of the glass member 204 is in a low laser absorptance state (e.g., appears whiter under visible light).

Figure 16:
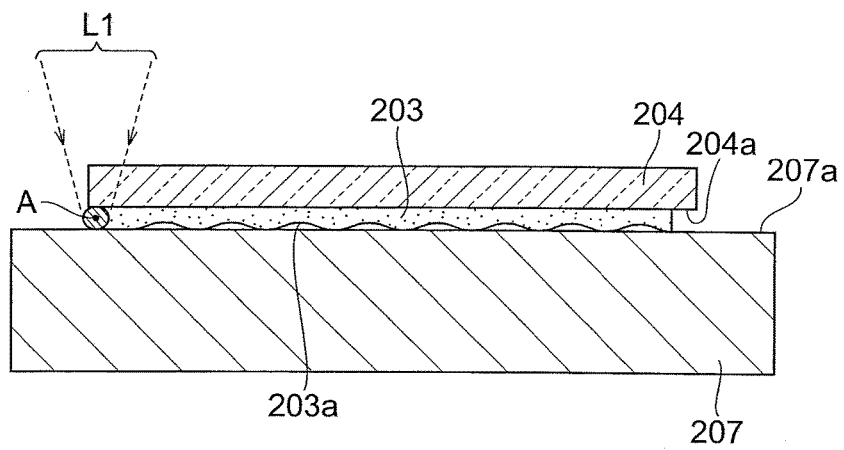
FIG. 16 is a sectional view for explaining the glass fusing method in accordance with the second embodiment.

Next, as illustrated in FIG. 16, the glass member 204 is mounted on a surface 207a (a polished surface here) of a planar mount table 207 made of aluminum, such that the glass layer 203 is interposed therebetween. As a consequence, the glass layer 203 formed by removing the organic solvent and binder from the paste layer 206 is disposed between the glass member 204 and the mount table 207 along the region to be fused R and the approach region S connected to the region to be fused R.

Figure 12:
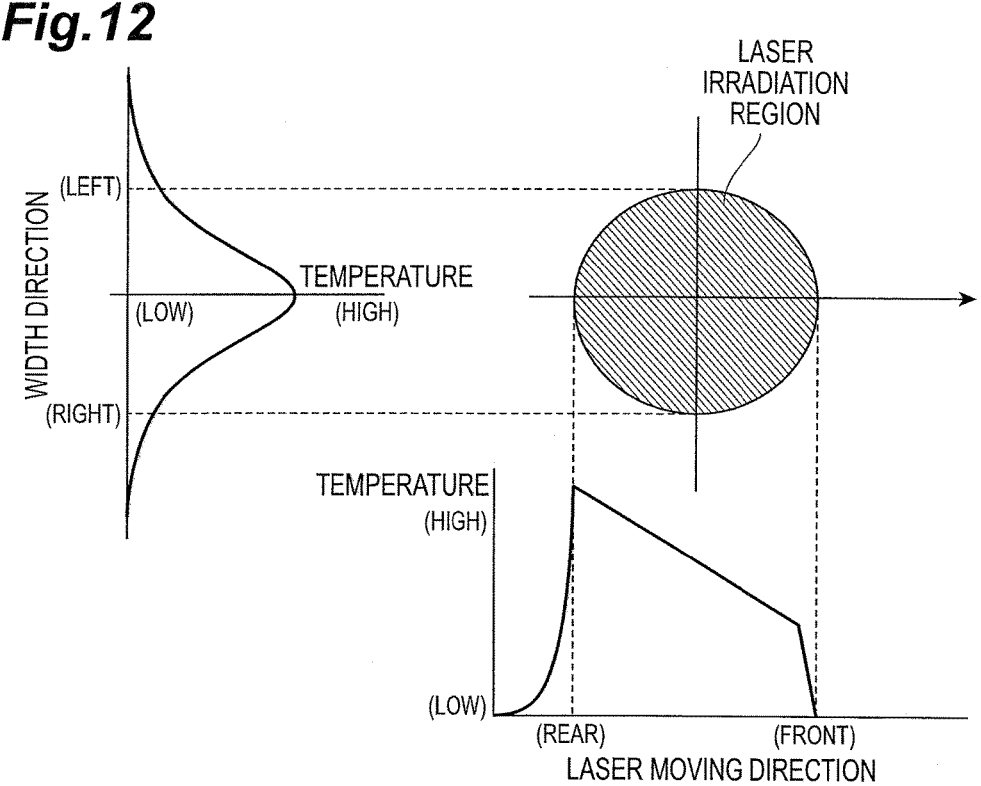
FIG. 12 is a graph illustrating a temperature distribution in laser irradiation.
Figure 13:
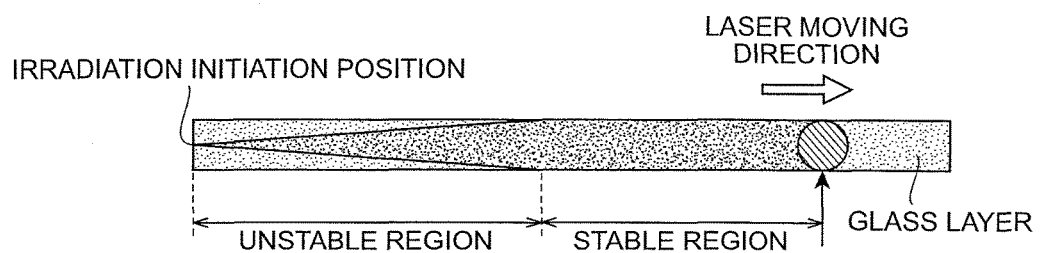
FIG. 13 is a diagram illustrating stable and unstable regions in laser irradiation.
Figure 17:
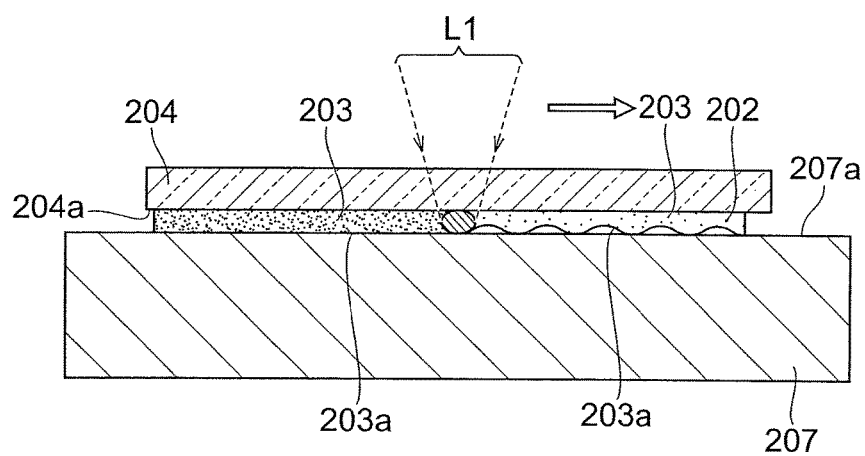
FIG. 17 is a sectional view for explaining the glass fusing method in accordance with the second embodiment.
Figure 18:
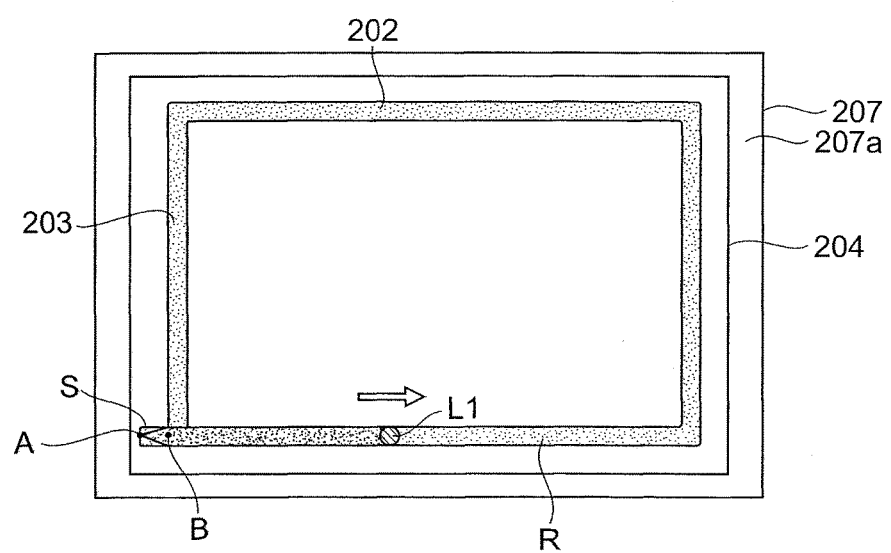
FIG. 18 is a plan view for explaining the glass fusing method in accordance with the second embodiment.

Then, as illustrated in FIGS. 16 to 18, irradiation with a laser beam (first laser beam) L1 begins from an irradiation initiation position A in the approach region S connected to the region to be fused R of the glass layer 203 while locating a converging spot at the approach region A, so as to progress along the approach region S to the region to be fused R. Meanwhile, since the laser beam L1 has the above-mentioned temperature distribution (see FIG. 12), the melting gradually expands in the width direction of the glass layer 203 (direction substantially orthogonal to the laser beam moving direction) from the irradiation initiation position A in the approach region S, so that a stable region where the glass layer 203 is melted throughout the width thereof is formed near a connection point B connected to the region to be fused R. That is, the approach region S disposed on the outside of the region to be fused includes the whole unstable region where the glass layer 203 is melted in a part of the width thereof.

Figure 19:
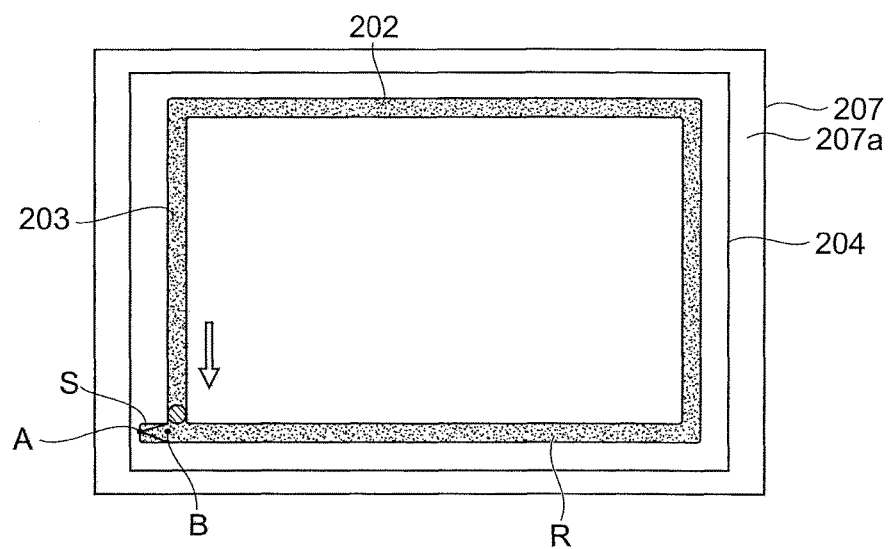
FIG. 19 is a plan view for explaining the glass fusing method in accordance with the second embodiment.

Thereafter, the irradiation of the glass layer 203 with the laser beam L1 is continued along the region to be fused R beyond the connection point B between the approach region S and the region to be fused R until returning to the connection point B as illustrated in FIG. 19.

Thus, the irradiation with the laser beam L1 begins from the irradiation initiation position A in the approach region S connected to the region to be fused R, and the melting of the region to be fused R is started after a stable region is formed, so that the glass layer 203 disposed on the glass member 204 stably melts and resolidifies throughout the region to be fused R, thereby burning the glass layer 203 onto the surface 204a of the glass member 204. As the glass fit 202 melts to fill voids, the glass layer 203 loses the graininess, so as to allow the laser-absorbing pigment to exhibit its absorption characteristic remarkably, thereby attaining a laser absorptance higher than that in regions not irradiated with the laser beam (e.g., appearing darker under visible light).

After the stable burning of the glass layer 203 is completed throughout the region to be fused R, the glass member 204 having the glass layer 203 burned thereonto is removed from the mount table 207. Here, since the difference between the coefficients of linear expansion of the glass frit 202 and the mount table 207 is greater than the difference between the coefficients of linear expansion of the glass frit 202 and the glass member 204, the glass layer 203 does not firmly attach to the mount table 207. Since the surface 207a of the mount table 207 is polished, the glass layer 203 burned onto the surface 204a of the glass member 204 is in a state where irregularities on the surface 203a on the side opposite from the glass member 204 are made flat. In this embodiment, the burning is carried out by irradiation with the laser beam L1 from the glass member 204 side, so that the glass layer 203 is reliably fixed to the glass member 204, while crystallization is reduced on the surface 203a side, whereby the melting point does not rise in this part. After the burning of the glass layer 203 is completed, the part of the glass layer 203 in the approach region S may be removed by a predetermined method as appropriate.

Figure 20:
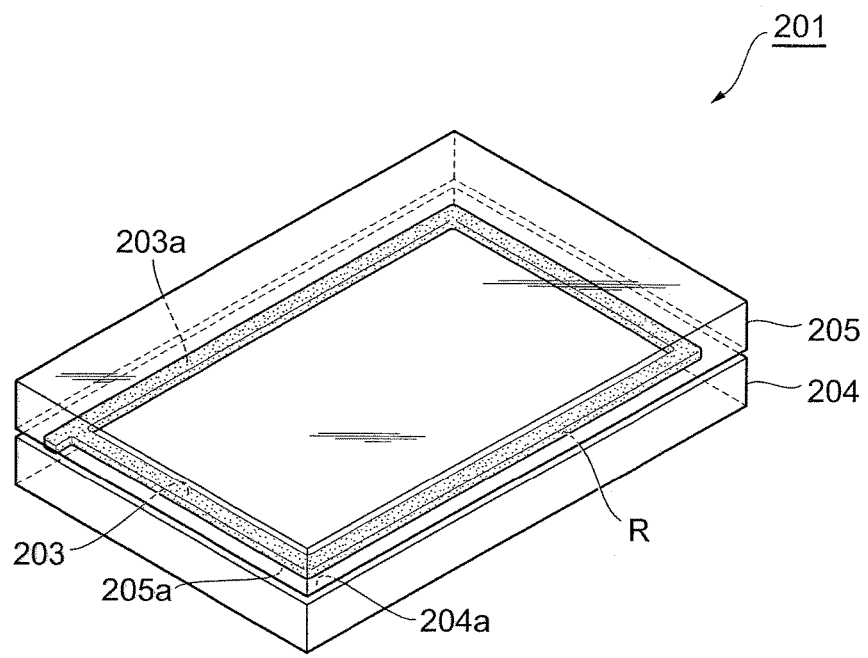
FIG. 20 is a perspective view for explaining the glass fusing method in accordance with the second embodiment.

Subsequent to the burning of the glass layer 203, as illustrated in FIG. 20, the glass member 205 is overlaid on the glass member 204 having the glass layer 203 burned thereonto, such that the glass layer 203 is interposed therebetween. Here, since the surface 203a of the glass layer 203 is made flat, a surface 205a of the glass member 205 comes into contact with the surface 203a of the glass layer 203 without gaps.

Figure 21:
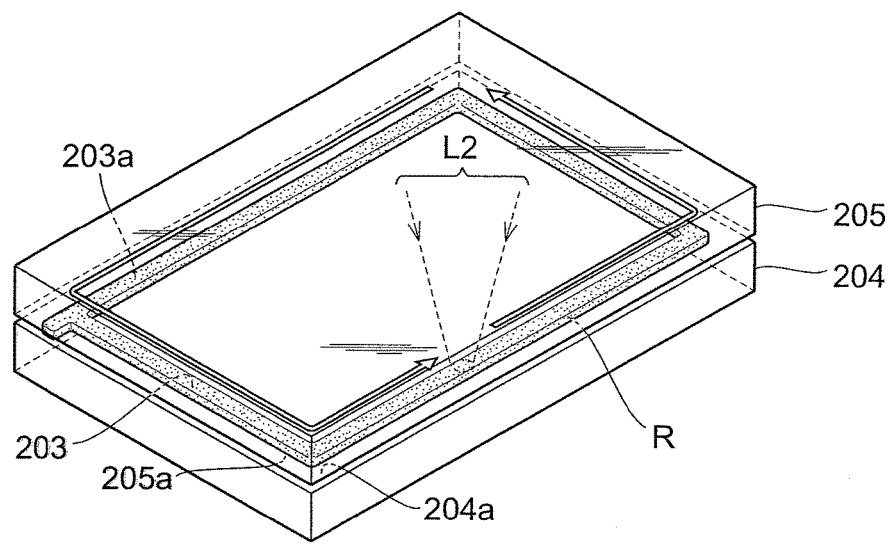
FIG. 21 is a perspective view for explaining the glass fusing method in accordance with the second embodiment.

Then, as illustrated in FIG. 21, the region to be fused R is irradiated therealong with a laser beam (second laser beam) L2 while locating a converging spot at the glass layer 203. As a consequence, the glass layer 203 in a uniform state with a high laser absorptance throughout the region to be fused R absorbs the laser beam L2, which melts and resolidifies the glass layer 203 and its peripheral portions (the portions of the glass members 204, 205 on the surfaces 204a, 205a) to similar extents, thereby bonding the glass members 204, 205 together. Here, the surface 205a of the glass member 205 comes into contact with the surface 203a of the glass layer 203 without gaps, while the glass layer 203 burned onto the glass member 204 is formed as a stable region where the melting is stable throughout the region to be fused R, whereby the glass members 204, 205 are uniformly fused along the region to be fused R.

As explained in the foregoing, when fixing the glass layer 203 to the glass member 204, the glass fusing method for manufacturing the glass fusing structure 201 irradiates the approach region S connected to the region to be fused R from the irradiation initiation position A in the approach region S, whereby the melting of the glass layer 203 extends in the width direction in the approach region S until it reaches the whole width. That is, the approach region S includes the whole unstable region. The glass layer 203 is melted beforehand in the approach region S and thus can be fixed to the glass member 204 while having an enhanced ratio of the stable region, whereby the glass members 204, 205 can be fused together through the glass layer 203 having the enhanced ratio of the stable region, so as to attain a uniform fused state.

In the above-mentioned glass fusing method, the approach region S is disposed on the outside of the rectangular-ring-shaped region to be fused R. This can keep powders such as glass powders generated from unmelted parts in the approach region S from entering the region to be fused R. The generated powders can easily be washed away. A further step of removing such an approach region after fixing the glass layer 203 to the glass member 204 can yield the glass fusing structure 201 having an excellent exterior form.

Third Embodiment

The third embodiment of the present invention will now be explained. This embodiment will set forth a glass fusing method for collectively manufacturing a plurality of glass fusing structures 201.

Figure 22:
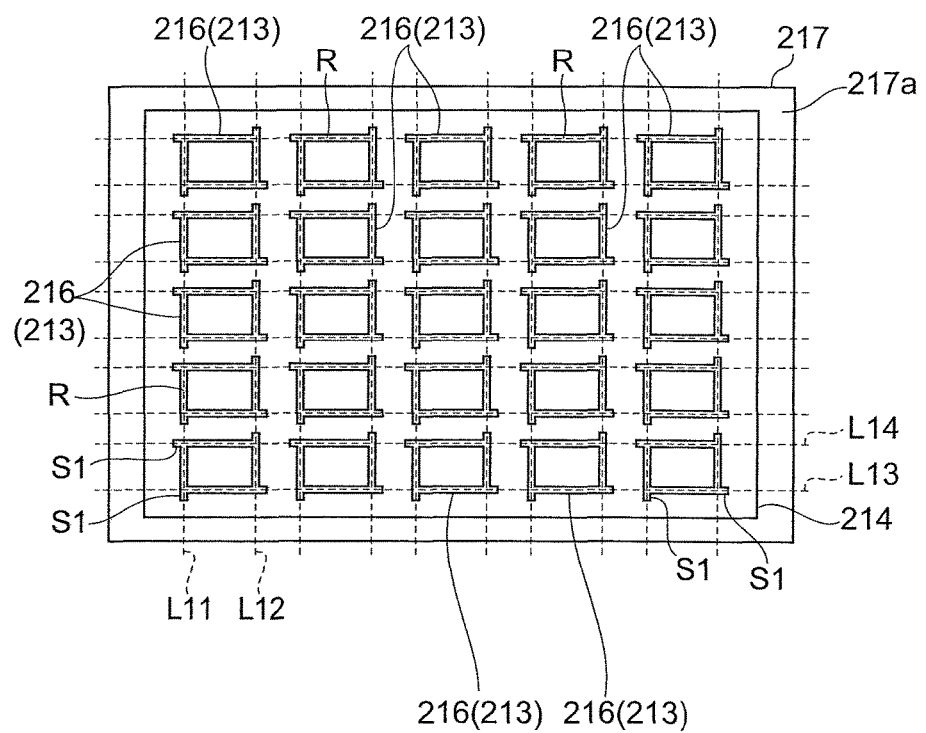
FIG. 22 is a plan view for explaining the glass fusing method in accordance with a third embodiment.

First, as illustrated in FIG. 22, a plurality of sets each constituted by a rectangular-ring-shaped region to be fused R and approach regions S1 connected to the region to be fused R are arranged into a matrix. This embodiment arranges five such sets of regions to be fused R and approach regions S1 in each of column- and row-wise directions.

Figure 23:
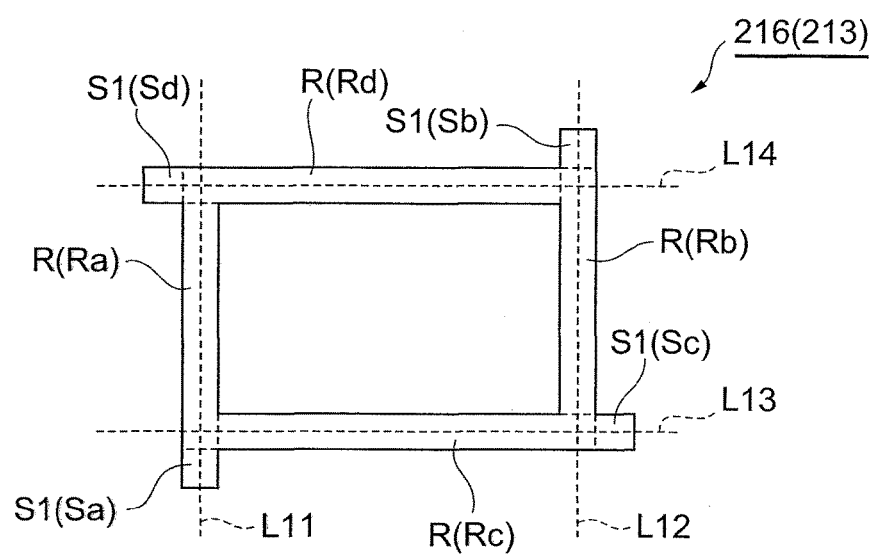
FIG. 23 is a plan view for explaining the glass fusing method in accordance with the third embodiment.

As illustrated in FIG. 23, each of the rectangular-ring-shaped regions to be fused R arranged in the matrix is constituted by a pair of regions to be fused Ra, Rb extending along respective column-wise lines L11, L12 (first and second lines) and a pair of regions to be fused Rc, Rd extending along respective row-wise lines L13, L14 (first and second lines). The approach regions S1 connected to the region to be fused R are constituted by an approach region Sa connected to one end part of the region to be fused Ra along the line L11, an approach region Sb connected to the other end part of the region to be fused Rb along the line L12, an approach region Sc connected to one end part of the region to be fused Rc along the line L13, and an approach region Sd connected to the other end part of the region to be fused Rd along the line L14.

After thus constructed regions to be fused R and approach regions S1 are arranged in the matrix with the same orientations, a frit paste is applied by a dispenser, screen printing, or the like as in the second embodiment, so as to form a plurality of paste layers 216 in a matrix on a surface 214a of a glass member 214 along the rectangular-ring-shaped regions to be fused R and the approach regions S1 connected to the rectangular-ring-shaped regions to be fused R as illustrated in FIG. 22.

Subsequently, the organic solvent and the binder are removed from each paste layer 216, so as to fix the glass layer 213 firmly to the surface 214a of the glass member 214 along the region to be fused R and the approach regions S1 connected to the region to be fused R. Here, in each of the glass layers 213 firmly attached to the surface 214a of the glass member 214, voids formed by the removal of the binder and the graininess of the glass fit produce scattering of light exceeding the absorption characteristic of the laser-absorbing pigment, so that the laser absorptance is low (e.g., the glass layer appears whiter under visible light). Thereafter, the glass member 214 is mounted on a surface (a polished surface here) of a planar mount table made of aluminum, such that the glass layer 213 is interposed therebetween.

Figure 24:
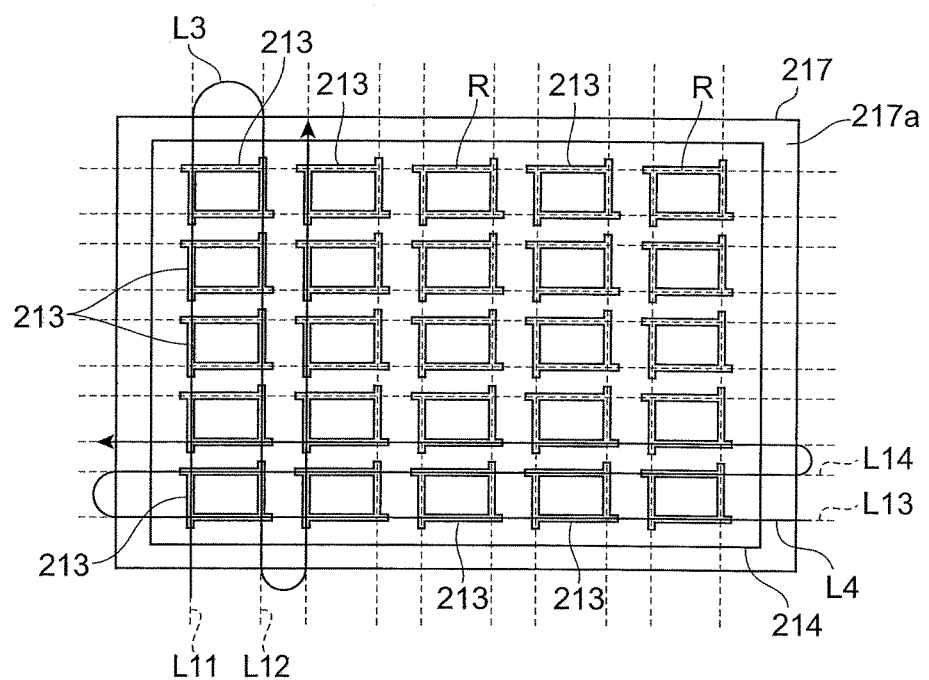
FIG. 24 is a plan view for explaining the glass fusing method in accordance with the third embodiment.

Next, as illustrated in FIG. 24, each of the glass layers 213 arranged in the matrix is burned onto the glass member 214.

First, a laser beam (first laser) L3 is moved along the line L11 from the lower side (one side) in the drawing to the upper side (the other side) in the drawing, so as to irradiate the five regions to be fused Ra arranged column-wise in the same orientation along the line L11 and the respective approach regions Sa connected to the regions to be fused Ra. When irradiating each set of the region to be fused Ra and approach region Sa therealong with the laser beam L3, as in the second embodiment, the approach region Sa is irradiated with the laser beam L3 from an irradiation initiation position in the approach region Sa, and then continuously the region to be fused Ra is irradiated therewith; this procedure is repeated.

Subsequently, the laser beam L3 is moved along the line L12 from the upper side in the drawing to the lower side in the drawing, so as to irradiate the five regions to be fused Rb arranged column-wise in the same orientation along the line L12 and the respective approach regions Sb connected to the regions to be fused Rb. When irradiating each set of the region to be fused Rb and approach region Sb with the laser beam L3, as in the second embodiment, the approach region Sb is irradiated with the laser beam L3 from an irradiation initiation position in the approach region Sb, and then continuously the region to be fused Rb is irradiated therewith; this procedure is repeated. Such column-wise reciprocating irradiation is similarly carried out for the glass layers 213 arranged in the other columns as well.

Next, a laser beam (first laser) L4 is moved along the line L13 from the right side (one side) in the drawing to the left side (the other side) in the drawing, so as to irradiate the five regions to be fused Rc arranged row-wise in the same orientation along the line L13 and the respective approach regions Sc connected to the regions to be fused Rc. When irradiating each set of the region to be fused Rc and approach region Sc with the laser beam L4, as in the second embodiment, the approach region Sc is irradiated with the laser beam L4 from an irradiation initiation position in the approach region Sc, and then continuously the region to be fused Rc is irradiated therewith; this procedure is repeated.

Figure 25:
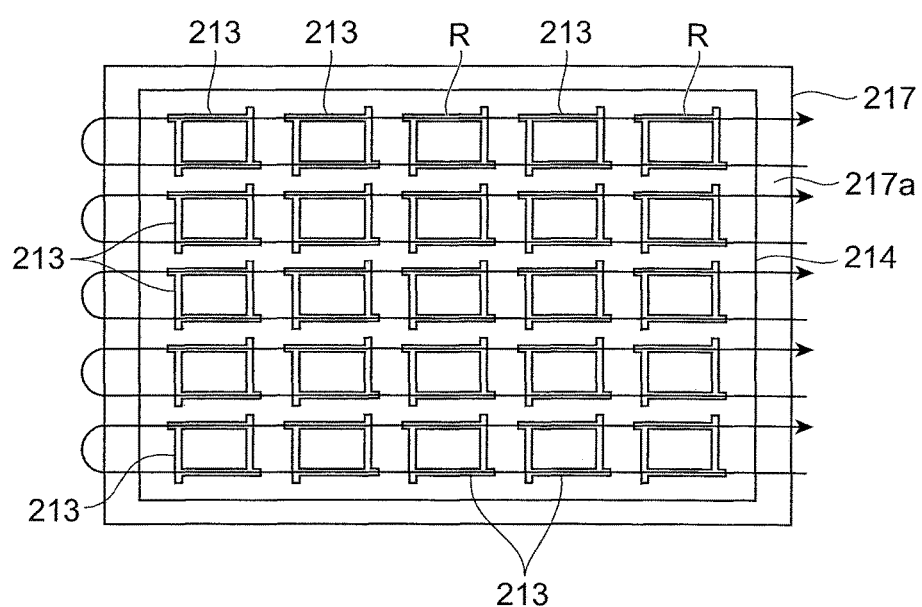
FIG. 25 is a plan view for explaining a modified example of the laser beam irradiation method in the third embodiment.

Subsequently, the laser beam L4 is moved along the line L14 from the left side in the drawing to the lower side in the drawing, so as to irradiate the five regions to be fused Rd arranged row-wise in the same orientation along the line L14 and the respective approach regions Sd connected to the regions to be fused Rd. When irradiating each set of the region to be fused Rd and approach region Sd with the laser beam L4, as in the second embodiment, the approach region Sd is irradiated with the laser beam L4 from an irradiation initiation position in the approach region Sd, and then continuously the region to be fused Rd is irradiated therewith; this procedure is repeated. Such row-wise reciprocating irradiation is similarly carried out for the glass layers 213 arranged in the other rows as well. Such irradiation collectively burns the glass layers 213 having an enhanced ratio of the stable region onto the glass member 214. Though the column- or row-wise irradiation with the laser beam L3, L4 is carried out by one laser in the above-mentioned explanation, a plurality of lasers may be used at the same time as illustrated in FIG. 25.

As the glass frit 202 melts to fill voids, each of the glass layers 213 burned onto the surface 214a of the glass member 214 loses the graininess, so as to allow the laser-absorbing pigment to exhibit its absorption characteristic remarkably, thereby attaining a high laser absorptance (e.g., appearing darker under visible light).

After the stable burning of each glass layer 213 is completed throughout the region to be fused R, the glass member 214 having the glass layer 213 burned thereonto is removed from the mount table 217, and the glass members 214, 215 are overlaid on each other with the glass layer 213 interposed therebetween. Then, while locating a converging spot at each glass layer 213, each of the regions to be fused R arranged in the matrix is irradiated with the laser beam L2. Each glass layer 213 in a uniform state with a high laser absorptance throughout the region to be fused R absorbs the laser beam L2, which melts and resolidifies the glass layer 213 and its peripheral portions (the portions of the glass members 214, 215 on the surfaces 214a, 215a) to similar extents, so as to bond the glass members 214, 215 together, thereby yielding a fused structure 220. The irradiation with the laser beam L2 may be carried out as in the above-mentioned burning of the glass layer 213 onto the glass member 214 with the laser beams L3, L4.

Figure 26:
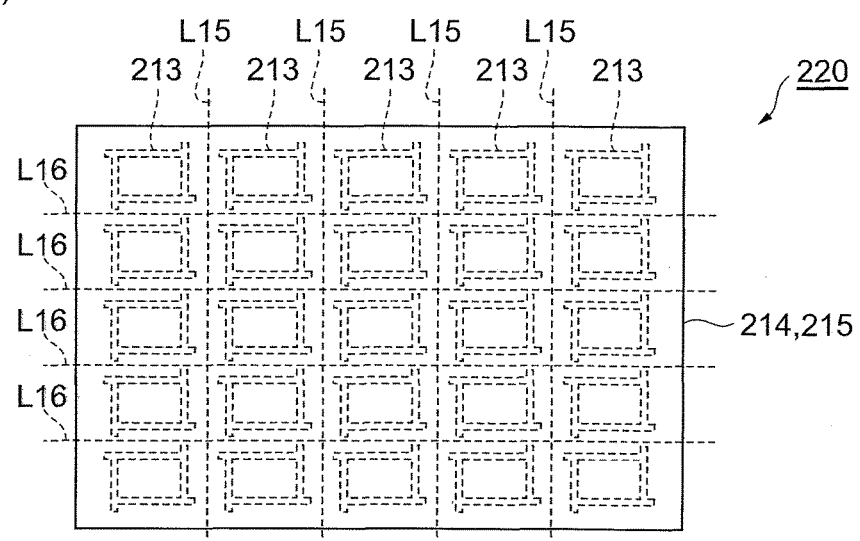
FIG. 26 is a view for explaining the glass fusing method in accordance with the third embodiment, in which (a) and (b) are plan and sectional views, respectively.
Figure 26:
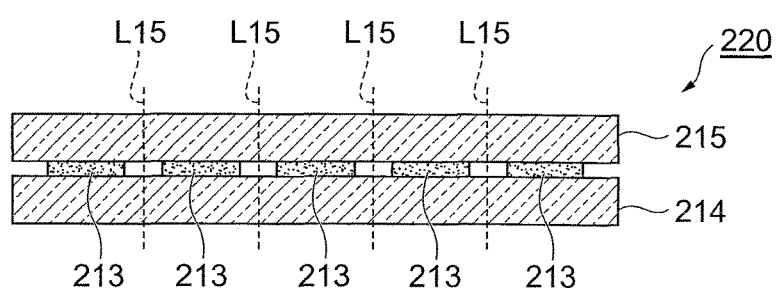

Subsequently, as illustrated in FIG. 26, the fused structure 220 constituted by the glass members 214, 215 is cut along column-wise lines L15 and row-wise lines L16 by a predetermined method. The cutting divides the fused structure, whereby a plurality of glass fusing structures 201 can be obtained collectively. The cutting may be carried out such as to remove the approach regions Sa to Sd from the glass fusing structures 201 as well.

As explained in the foregoing, the glass fusing method for manufacturing the glass fusing structures 201 includes the step of arranging the regions to be fused Ra, Rc and the approach regions Sa, Sc connected to respective one end parts of the regions to be fused Ra, Rc along the column- and row-wise lines L11, L13, respectively, and the regions to be fused Rb, Rd and the approach regions Sb, Sd connected to respective other end parts of the regions to be fused Rb, Rd along the column- and row-wise lines L12, L14, respectively; and, during the irradiation with the laser beams L3, L4, moves the laser beams L3, L4 from one side to the other side along the lines L11, L13 and then continuously from the other side to the one side along the lines L12, L14. Thus moving the laser beams L3, L4 to-and-fro along the column- and row-wise lines L11, L13, L12, L14 makes it possible to melt the glass layer 213 in the approach regions Sa to Sd and then the regions to be fused Ra to Rd continuously in the respective regions to be fused R arranged along the lines L11, L13, L12, L14, whereby a plurality of glass layers 213 having an enhanced ratio of the stable region can be obtained efficiently.

The above-mentioned glass fusing method also includes the step of arranging a plurality of regions to be fused R and the approach regions S1 connected to the end parts of the regions to be fused R along each of the column- and row-wise lines L11 to L14; and, during the irradiation with the laser beams L3, L4, moves the laser beams L3, L4 from one side to the other side or from the other side to the one side along the lines L11 to L14. Thus moving the laser beams L3, L4 to-and-fro along the column- and row-wise lines L11 to L14 makes it possible to melt the glass layer 213 in the approach regions Sa to Sd and then the regions to be fused Ra to Rd continuously in a plurality of regions to be fused R arranged along the lines L11 to L14, whereby a plurality of glass layers 213 having an enhanced ratio of the stable region can be obtained efficiently.

Since the glass members 214, 215 are fused together through the glass layers 213 thus burned onto the glass member 214 so as to reduce the unstable region, the fused state between the glass members 214, 215 can be made uniform even though the glass layers 213 are fixed thereto along a plurality of regions to be fused R, whereby a plurality of glass fusing structures 201 having a favorable fused state can be manufactured collectively.

The present invention is not limited to the above-mentioned embodiments.

For example, while the second and third embodiments use rectangular-ring-shaped regions to be fused R, the present invention is also applicable to circular-ring-shaped regions to be fused. Though the second and third embodiments irradiate the glass layers 203, 213 with the laser beams L1, L3, L4 through the glass members 204, 214, the glass layers 203, 213 may directly be irradiated with the laser beams L1, L3, L4 from the opposite side.

The second and third embodiments move the laser beams L1 to L4, while securing the glass members 204, 205, 214, 215. However, it will be sufficient for the laser beams L1 to L4 to be moved relative to the glass members 204, 205, 214, 215. The glass members 204, 205, 214, 215 may be moved while securing the laser beams L1 to L4, or each of the laser beams L1 to L4 and the glass members 204, 205, 214, 215 may be moved.

INDUSTRIAL APPLICABILITY

The present invention can attain a uniform fused state between glass members.

REFERENCE SIGNS LIST 101, 201 . . . glass fusing structure; 102, 202 . . . glass frit (glass powder); 103, 203, 213 . . . glass layer; 104, 204, 214 . . . glass member (first glass member); 105, 205, 215 . . . glass member (second glass member); 106, 206, 216 . . . paste layer; 107, 207, 217 . . . mount table; 108a to 108d . . . laser-absorbing part; 220 . . . fused structure; A . . . irradiation initiation position; B . . . connection position; R, Ra, Rb, Rc, Rd . . . region to be fused; L1, L3, L4 . . . laser beam (first laser beam); L2 . . . laser beam (second laser beam); L3 . . . laser beam (third laser beam); L11, L13 . . . line (first line); L12, L14 . . . line (second line); L15, L16 . . . cut line; S, Sa, Sb, Sc, Sd . . . approach region

The invention claimed is:

1. A glass fusing method for manufacturing a glass fusing structure by fusing first and second glass members together, the method comprising the steps of:
 disposing a glass layer on the first glass member along a region to be fused, the glass layer being formed by removing an organic solvent and a binder from a paste layer containing a glass powder, a laser-absorbing material, the organic solvent and the binder;
 irradiating a part of the glass layer with a first laser beam, so as to melt the part of the glass layer and form a laser-absorbing part in the glass layer;
 irradiating the region to be fused therealong with a second laser beam while using the laser-absorbing part, formed in advance by irradiation with the first laser beam, as an irradiation initiation position, so as to melt the glass layer and fix the glass layer to the first glass member;
 overlaying the second glass member on the first glass member having the glass layer fixed thereto such that the glass layer is interposed therebetween, and irradiating the region to be fused therealong with a third laser beam, so as to fuse the first and second glass members together; and
 the first laser beam is different from the second laser beam and both of the aforementioned laser beams are different from the third laser beam.

2. A glass fusing method according to claim 1, wherein the laser-absorbing part is formed in the part of the glass layer throughout the width of the glass layer in a direction intersecting a moving direction of the second laser beam with respect to the region to be fused.

3. A glass fusing method according to claim 1, wherein the laser-absorbing part is formed such that a center part thereof in a direction intersecting a moving direction of the second laser beam with respect to the region to be fused projects in the moving direction of the second laser beam.

4. A glass fusing method according to claim 1, wherein a plurality of laser-absorbing parts are formed intermittently along the region to be fused; and
 wherein one of the plurality of laser-absorbing parts is used as the irradiation initiation position.

5. A glass fusing method for manufacturing a glass fusing structure by fusing first and second glass members together, the method comprising the steps of:
 disposing a glass layer on the first glass member along a region to be fused that is set on a surface of the first glass member and a predetermined region connected to the region to be fused, the glass layer being formed by removing an organic solvent and a binder from a paste layer containing a glass powder, a laser-absorbing material, the organic solvent and the binder;
 irradiating the predetermined region therealong from an irradiation initiation position in the predetermined region with a first laser beam and then continuously irradiating the region to be fused therealong with the first laser beam, so as to melt the glass layer and fix the glass layer to the first glass member;
 overlaying the second glass member on the first glass member having the glass layer fixed thereto such that the glass layer is interposed, and irradiating the region to be fused therealong with a second laser beam, so as to fuse the first and second glass members together;
 the first laser beam is different from the second laser beam;
 the region to be fused is a ring-shaped region; and
 the predetermined region is a region projecting from the ring-shaped region to be fused so as to follow horizontally along the surface of the first glass member, the predetermined region being a region that is different from the ring-shaped region to be fused, the predetermined region projecting as viewed from a direction perpendicular to the surface of the first glass member on which the ring-shaped region to be fused is set.

6. A glass fusing method according to claim 5, wherein the predetermined region includes a whole unstable region where the melting of the glass layer becomes unstable when irradiated once from the irradiation initiation position with the first laser beam.

7. A glass fusing method according to claim 5, wherein the predetermined region is disposed on the outside of a ring-shaped region to be fused.

8. A glass fusing method according to claim 5, further comprising the step of arranging a first portion of the region to be fused and the predetermined region connected to one end part of the first portion of the region to be fused along a first line extending in a predetermined direction between one side and an other side in the first glass member and arranging a second portion of the region to be fused and the predetermined region connected to the other end part of the second portion of the region to be fused along a second line extending in the predetermined direction in the first glass member;
    wherein, during irradiation with the first laser beam, the first laser beam is relatively moved from the one side to the other side along the first line and then continuously relatively moved from the other side to the one side along the second line.

9. A glass fusing method according to claim 5, further comprising the step of arranging at least two sets each constituted by a first portion of the region to be fused and the predetermined region connected to one end part of the first portion of the region to be fused along a line extending in a predetermined direction between one side and an other side in the first glass member;
    wherein, during irradiation with the first laser beam, the first laser beam is relatively moved from the one side to the other side along the first line.

10. A glass layer fixing method for fixing a glass layer to a first glass member along a region to be fused in which the first glass member and a second glass member are adapted to be fused together, the method comprising the steps of:
    disposing the glass layer on the first glass member along the region to be fused, the glass layer being formed by removing an organic solvent and a binder from a paste layer containing a glass powder, a laser-absorbing material, the organic solvent and the binder;
    irradiating a part of the glass layer with a first laser beam, so as to melt the part of the glass layer and form a laser-absorbing part in the glass layer; and
    irradiating the region to be fused therealong with a second laser beam while using the laser-absorbing part, formed in advance by irradiation with the first laser beam, as an irradiation initiation position, so as to melt the glass layer and fix the glass layer to the first glass member;
    the first laser beam is different from the second laser beam; and
    the glass layer disposed on the first glass member is irradiated with the first laser beam and the second laser beam before the second glass member is overlaid on the first glass member such that the glass layer is interposed between the first and second glass members when the second glass member is later overlaid on the first glass member.

11. A glass layer fixing method according to claim 10, wherein the laser-absorbing part is formed in the part of the glass layer throughout the width of the glass layer in a direction intersecting a moving direction of the second laser beam with respect to the region to be fused.

12. A glass layer fixing method according to claim 10, wherein the laser-absorbing part is formed such that a center part thereof in a direction intersecting a moving direction of the second laser beam with respect to the region to be fused projects in the moving direction of the second laser beam.

13. A glass layer fixing method according to claim 10, wherein a plurality of laser-absorbing parts are formed intermittently along the region to be fused; and
    wherein one of the plurality of laser-absorbing parts is used as the irradiation initiation position.

14. A glass layer fixing method for fixing a glass layer to a first glass member along a region to be fused that is set on a surface of the first glass member in which the first glass member and a second glass member are adapted to be fused together, the method comprising the steps of:
    disposing the glass layer on the first glass member along the region to be fused and a predetermined region connected to the region to be fused, the glass layer being formed by removing an organic solvent and a binder from a paste layer containing a glass powder, a laser-absorbing material, the organic solvent and the binder;
    irradiating the predetermined region therealong from an irradiation initiation position in the predetermined region with a first laser beam and then continuously irradiating the region to be fused therealong with the first laser beam, so as to melt the glass layer and fix the glass layer to the first glass member;
    the region to be fused is a ring-shaped region; and
    the predetermined region is a region projecting from the ring-shaped region to be fused so as to follow horizontally along the surface of the first glass member, the predetermined region being a region that is different from the ring-shaped region to be fused, the predetermined region projecting as viewed from a direction perpendicular to the surface of the first glass member on which the ring-shaped region to be fused is set.

15. A glass layer fixing method according to claim 14, wherein the predetermined region includes a whole unstable region where the melting of the glass layer becomes unstable when irradiated once from the irradiation initiation position with the first laser beam.

16. A glass layer fixing method according to claim 14, wherein the predetermined region is disposed on the outside of a ring-shaped region to be fused.

17. A glass layer fixing method according to claim 14, further comprising the step of arranging a first portion of the region to be fused and the predetermined region connected to one end part of the first portion of the region to be fused along a first line extending in a predetermined direction between one side and an other side in the first glass member and arranging a second portion of the region to be fused and the predetermined region connected to the other end part of the second portion of the region to be fused along a second line extending in the predetermined direction in the first glass member;
    wherein, during irradiation with the first laser beam, the first laser beam is relatively moved from the one side to the other side along the first line and then continuously relatively moved from the other side to the one side along the second line.

18. A glass layer fixing method according to claim 14, further comprising the step of arranging at least two sets each constituted by a first portion of the region to be fused and the predetermined region connected to one end part of the first portion of the region to be fused along a line extending in a predetermined direction between one side and an other side in the first glass member;

wherein, during irradiation with the first laser beam, the first laser beam is relatively moved from the one side to the other side along the first line.

\* \* \* \* \*